United States Patent [19]

Morikawa et al.

[11] Patent Number: 5,333,057
[45] Date of Patent: Jul. 26, 1994

[54] PHOTOCOPIER

[75] Inventors: Takeshi Morikawa, Toyokawa; Masahito Niikawa, Okazaki, both of Japan

[73] Assignee: Minolta Camera Kabushiki Kaisha, Osaka, Japan

[21] Appl. No.: 114,457

[22] Filed: Aug. 31, 1993

[30] Foreign Application Priority Data

Aug. 31, 1992 [JP] Japan .................................. 4-232331

[51] Int. Cl.$^5$ ............................................ H04N 1/21
[52] U.S. Cl. .................................................... 358/296
[58] Field of Search ................. 346/108, 107 R, 160, 346/1.1, 76 L; 358/296, 300, 302, 298

[56] References Cited

U.S. PATENT DOCUMENTS

| 5,241,473 | 8/1993 | Ishihara et al. | 364/413.25 |
| 5,255,013 | 10/1993 | Ng | 346/107 R |
| 5,255,364 | 10/1993 | Hirose | 395/164 |

FOREIGN PATENT DOCUMENTS

| 3-97372 | 4/1991 | Japan . |
| 4-157874 | 5/1992 | Japan . |
| 4-227160 | 8/1992 | Japan . |

Primary Examiner—Mark J. Reinhart
Attorney, Agent, or Firm—Willian Brinks Hofer Gilson & Lione

[57] ABSTRACT

The present invention discloses a photocopier with an electronic sorting function which can change over to an appropriate control at an occurrence of a memory-full by using a control device to avoid the interference of copying operation as well as minimizing the time required. More precisely, the control unit forcibly changes the number of copies to 1 when the memory-full occurs, thence reads out the data per page for printing out them once and clears them. Thus, the memory restores a free area and the data of the following page are successively written thereinto. By repeating the above readout-clear-writing procedure, the data of all the documents are safely stored in the memory and read out for the printing successively. As a result, a complete set of the documents is copied, albeit one. On the other hand, the control unit cancels the electronic sorting mode, and hence the readout sequence set in advance when the memory-full occurs, and reads out the data from the memory in the same sequence as the documents were read for as many times as the desired number of copies to clear them subsequently and releases it from the memory-full. By cancelling the preset readout sequence, not only the data in the memory can be efficiently utilized, but also as many copies as desired can be made without any inteference during the copying operation.

11 Claims, 23 Drawing Sheets

| Area | Page | Fore-concatenation | Aft-concatenation | Additional Data |
|---|---|---|---|---|
| 00 | 1 | 00 | 01 | |
| 01 | 1 | 01 | FF | |
| 02 | 2 | 00 | 03 | |
| 03 | 2 | 03 | FF | |
| ⋮ | | | | |

MT1

306 Code Memory

| | |
|---|---|
| 0 | Compressed code data 1 of page 1 |
| 32K | Compressed code data 2 of page 1 |
| 64K | Compressed code data 1 of page 2 |
| 96K | Compressed code data 2 of page 2 |
| 128K | |

Direct Mode

Writing Operation in Memory Mode

Readout Operation in Memory Mode

Fig.11 (a) Code Memory (Memory-Full)
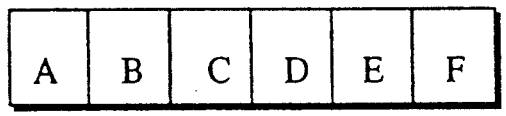
Fig.11 (b) Code Memory (Memory-Full)    Discharged Copy Sheet
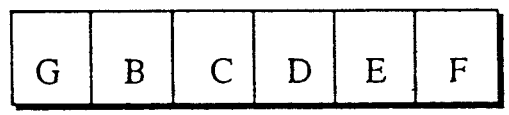    
Fig.11 (c) Code Memory (Memory-Full)    Discharged Copy Sheets
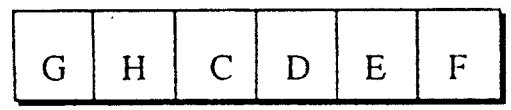    
Fig.11 (d) Code Memory    Discharged Copy Sheets
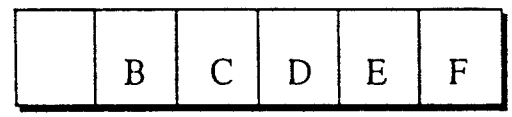    
Fig.11 (e) Code Memory    Discharged Copy Sheets
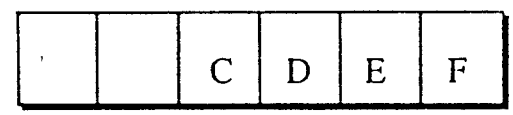    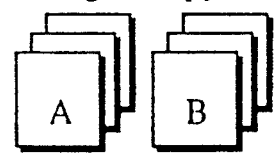

PHOTOCOPIER

BACKGROUND OF THE INVENTION (1) Field of the Invention

The present invention relates to a digital photocopier which performs an electronic sorting function by storing image data into a memory.

(2) Description of the Related Art

The recent technology enables a general digital photocopier to perform a so-called electronic sorting function: copying sheets are sorted into sets by electronic technique instead of particular mechanism. In this electronic sorting, image data of all the documents are stored into a memory in the form of compressed code data which are read out at a time of the printing as many times as the number of copies. The image data are compressed into the code data because a capacity of the memory is relatively small for the massive amount thereof.

Yet, the amount of the compressed code data exceeds the capacity depending on the size, particulars, and the number of pages of the documents. For example, if ten pages of documents are to be copied when the memory has a capacity of five pages, the memory becomes full when it has stored the data up to the fifth page. When this "memory-full" happens, users decide whether to eliminate the stored data or to make the desired number of copies up to the pages of which data are safely stored in the memory and repeat the same procedure for the remaining documents.

However, eliminating the stored data means a waste of time. As well, repeating the procedure means to cause trouble; for the copy sheets per set are discharged onto a single catch tray and the sets are sorted out manually in this type of photocopier, the users must repeat this manual sorting as many times as the procedure is repeated.

Further, the memory can be programmed to make copies in any desired sequence of pages when the memory has stored the data of all documents. However, the sequence may be disordered once the memory-full happens. As a result, all the copy sheets must be checked and sorted out manually after all, which is troublesome all the more.

SUMMARY OF THE INVENTION

The present invention has an object to provide a digital photocopier with an electronic sorting function which can change over to an appropriate control at an occurrence of a memory-full to avoid the interference of copying operation as well as minimizing the time required.

The above object is fulfilled by providing a control device in the photocopier. More precisely, the control unit forcibly changes the number of copies to 1 when the memory-full occurs, thence reads out the data per page for printing them out once and clears them. Thus, the memory restores a free area and the data of the following page are successively written thereinto. By repeating the above readout-clear-writing procedure, the data of all the documents are safely stored in the memory and read out for the printing successively. As a result, a complete set of the documents is copied, albeit one.

On the other hand, the control unit cancels the readout sequence set in advance when the memory-full occurs, and reads out the data from the memory in the same sequence as the documents were read for as many times as the desired number of copies. Since the data are cleared upon the final read out, the memory is released from the memory-full. Thus, by cancelling the preset readout sequence, not only the data in the memory are efficiently utilized, but also as many copies as desired can be made without any inteference during the copying operation.

BRIEF DESCRIPTION OF THE DRAWING

These and other objects, advantages and features of the invention will become apparent from the following description thereof taken in conjugation with the accompanying drawings which illustrate specific embodiments of the invention. In the drawings:

FIGS. 11a to 11e are views explaining how the code data are written and readout;

DESCRIPTION OF THE PREFERRED EMBODIMENTS (First Embodiment)

Figure 1:
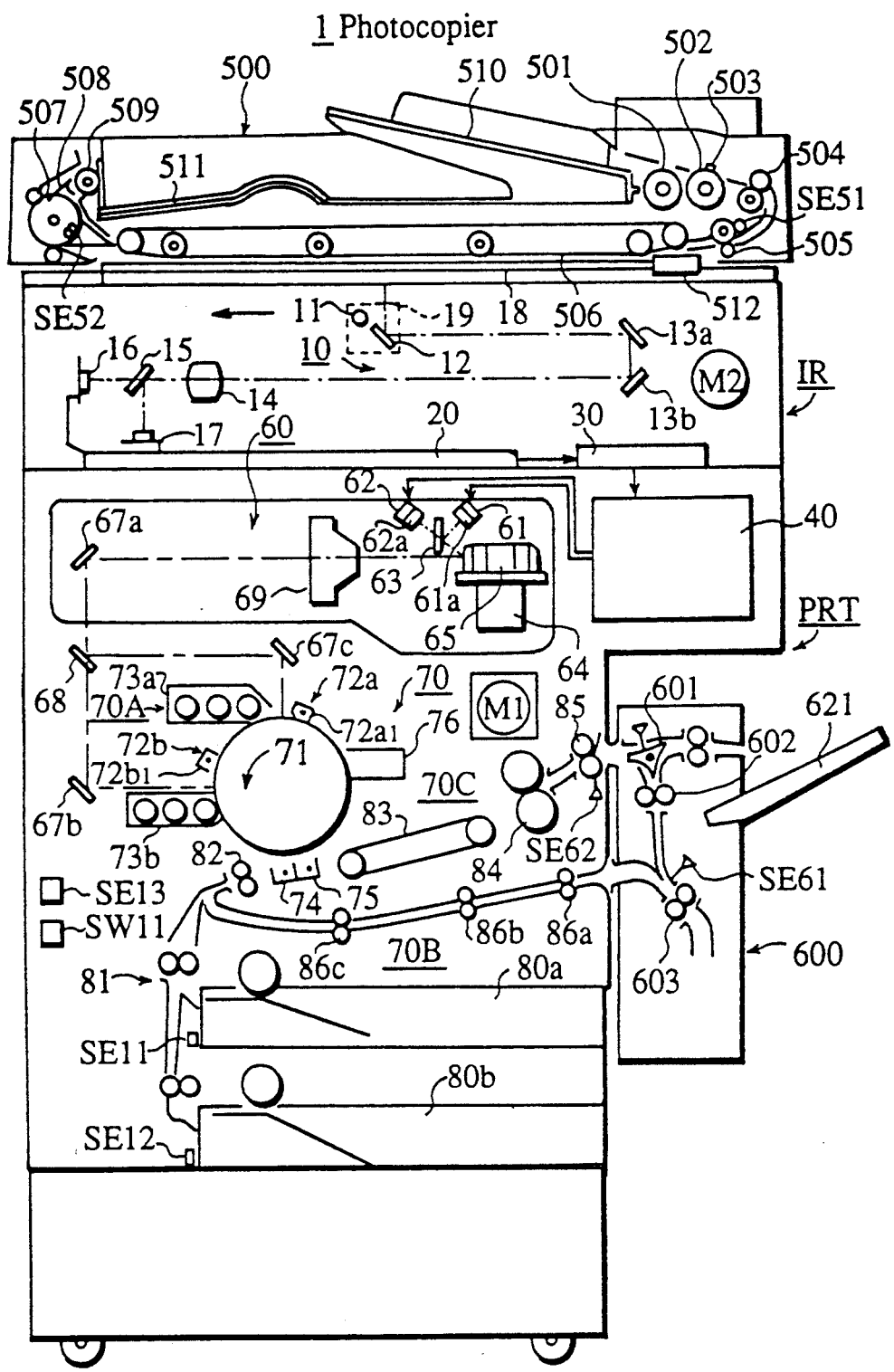
FIG. 1 is a cross sectional view of the photocopier as an example of the present invention.
Figure 2:
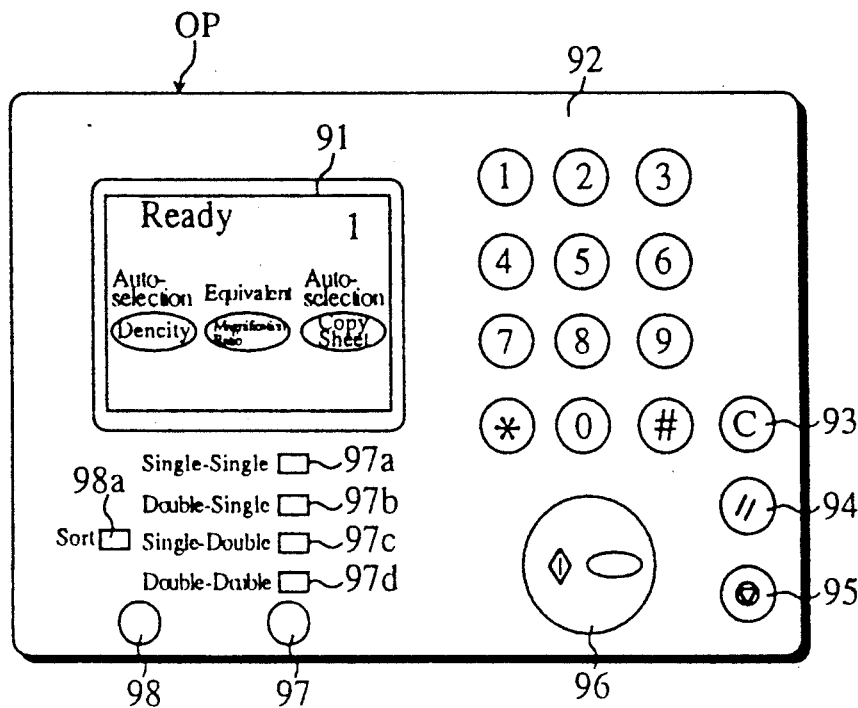
FIGS. 2(a) and 2(b) are top views of the operation panel OP.
Figure 2:
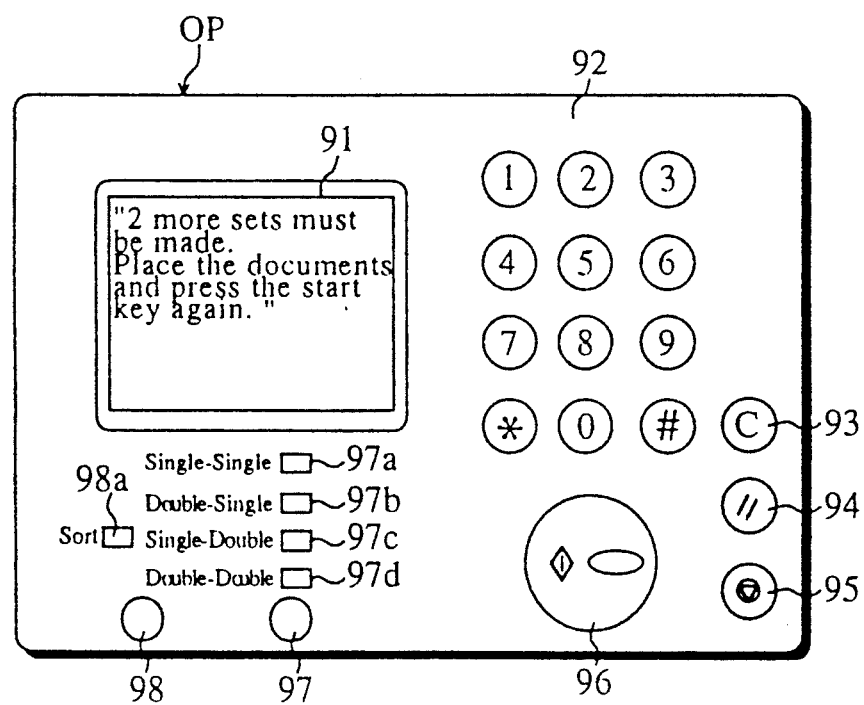

A cross sectional view of a digital, color, and double-side photocopier as an example of the first embodiment is depicted in FIG. 1. The photocopier 1 mainly comprises an image reading unit IR consisting of a scanning system 10 and an image signal processor 20, and a printing unit PRT consisting of a printing processor 40, an optical system 60, and an image forming system 70. It also includes a memory unit 30, a document transporting unit 500, a duplex unit 600, an operation panel OP (shown in FIG. 2), and a control unit 100 (shown in FIG. 3).

The scanning system 10 reads a document and converts the obtained data into an image signal. It consists of an exposure lamp 11 and a first mirror 12 installed in a scanner 19 which reciprocates underneath a document glass table 18, a second mirror 13a and a third mirror 13b, a condenser lens 14, a dichroic mirror 15, photovoltaic elements 16 and 17 such as a CCD (Charged Coupled Device) array, and a scan motor M2. The dichroic mirror 15 receives light reflected from the documents and reflects that of a specific color such as red, while allowing that of the complementary colors to transmit it through. The photovoltaic elements 16 and 17 convert light of non-specific color(substantially black) and the specific color(red) into respective image signals. Hereinafter, let the non-specific color be referred to as the first color and the specific color as the second color for explanation's convenience.

The image signal processor 20 includes an A/D-(Analogue/Digital) convertor, a shading correcting device, a magnification ratio processing device, a quality correcting device, and a color discriminating device for discriminating the color of a pixel based on the two image signals, all of which are not illustrated in the drawing. It quantizes the image signals from the photovoltaic elements 16 and 17 into 8-bit image data per pixel, applies necessary processing such as shading, quality, and magnification ratio correction, and outputs to the memory unit 30 image data D2 together with 1-bit color data DC indicating that whether the pixel is of the second color or not.

The memory unit 30, in summary, transmits the image data D2 and color data DC as image data D3 and the color data DC to the printing unit PRT either directly, or through a memory installed therein. Since the memory unit 30 plays an important role in the present invention, the details of which will be explained later.

The printing unit 40 drives two semiconductor lasers 61 and 62 of the optical system 60: it selectively outputs the image data D3 to one of the semiconductor lasers 61 and 62 in accordance with the color thereof specified by the color data DC. Given that the printing unit 40 operates in relation with the memory unit 30, the detail of which will be described later as well.

The optical system 60 guides light of two beams from semiconductor lasers 61 and 62 to respective points of exposure on a photosensitive drum 71. It consists of the semiconductor lasers 61 and 62, a dichroic mirror 62 for synthesizing the light of the two beams, a polygonal mirror 65 for deflecting the synthesized beam light, a primary lens 69, a reflecting mirror 67a, a dichroic mirror 68 for separating the synthesized beam light into the light of the original two beams, and reflecting mirrors 67b and 67c.

The image forming system 70 consists of a developing.transferring system 70A, a transporting system 70B, and a fixing system 70C; a latent image formed on the photosensitive drum 71 by radiation is developed, transferred, and further fixed onto a copy sheet. The developing. transferring system 70A includes the photosensitive drum 71 which rotates counterclockwise; a first charger 72a, a first developing device 73a, a second charger 72b, a second developing device 73b, a transferring charger 74, a separating charger 75, and a cleaning device 76, all of which are placed in the downstream of the photosensitive drum 71. The first developing device 73a contains a developer made of toner of the second color and a carrier. Likewise, the second developing device 73b contains a developer made of toner of the first color and the carrier. The transporting system 70B includes cassettes 80a and 80b each containing copy sheets in respective sizes, size detecting sensors SE11 and SE12 for detecting the copy sheet size, a copy sheet guide 81, a pair of timing rollers(hereinafter, simply referred to as the timing roller) 82, a transporting belt 83, and three pairs of rollers(rollers) 86a-86c for trans-, porting the copy sheet from the duplex unit 600 to the developing. transferring system 70A again. The fixing system 70C includes a pair of fixing rollers (fixing roller) 84 for transporting the copy sheet while fixing the developed image onto the copy sheet through the thermocompression bonding, a pair of discharge rollers (discharge roller) 85, and a discharge sensor SE62 for detecting the discharge of the copy sheet into the duplex unit 600.

The document transporting unit 500 includes a feeding roller 501, a separating roller 502, a separating pad 503, a pair of intermediate rollers(intermediate roller) 504, a pair of resist rollers(resist roller) 505, a transporting belt 506, a set of reversing rollers(reversing roller) 507, a switching claw 508, a discharge roller 509, a document tray 510, a catch tray 511, a document scaler 512, a feeding sensor SE51, and a discharge sensor SE52. A document placed on the document tray 510 is automatically transported onto the document glass table 18 and read by the scanner 19. Subsequently, the document is discharged directly onto the catch tray 511 when the front side alone is to be copied, or it is reversed and forwarded to the document glass table 18 again by means of the reversing roller 507 and switching claw 508 when both of the sides are to be copied.

The document transporting unit 500 operates either in a scanning reading mode or an auto-feeding reading mode. In the former, the scanner 19 reciprocates while the document is suspended at a reading position, whereas the document passes by the scanner 19 fixedly attached to the reading position in the latter. Set forth in Table 1 is available combinations of the copying and reading modes.

TABLE 1

| Reading | Copying | |
|---|---|---|
| | Single-side | Double-side |
| Scanning mode | o | o |
| Auto-feeding mode | o | o |

As an example, the operation of the document transporting unit 500 in the single-side/scanning mode is explained. For explanation's convenience, there let be a plurality of documents.

The documents are placed with their front sides upwards on the document tray 510, and the last page thereof is guided into the separating roller 502 and separating pad 503 by the feeding roller 501 to ensure the passage of one sheet alone, thence transported into the resist roller 505 through the intermediate roller 504 for being aligned straight, and finally transported onto the document glass table 18. When the bottom end of the document passes by the left end of the document scaler 512, the transporting belt 506 reverses slightly and stops to fit these two ends, so that the document is precisely placed on a predetermined position. Under these conditions, the scanner 19 reads the front side of the document(the lower surface facing to the document glass table 18), while at the same time the second last page is transported in such a way that the top end thereof reaches the resist roller 505, efficiently transporting the documents to minimize the required time. Upon completion of the reading, the transporting belt 506 starts to rotate again, and the document is transported towards left to make a U-turn around the reversing roller 507. Subsequently, the document is transported above the switching claw 508 to be discharged onto the catch tray 511 with its front side upwards by the discharge roller 509.

When both of the sides are to be read, the resist roller 507 and switching claw 508 circulate the document back to the document glass table 18; however, the detailed explanation thereof is omitted, as it is not the gist of the present invention.

The duplex unit 600 includes a switching claw 601 for selectively guiding the copy sheet onto a catch tray 621 or the printing unit PRT, a pair of transporting rollers (transporting roller) 602, a pair of reversing rollers(reversing roller) 603, and a reversion sensor SE61. It temporarily holds the copy sheet from the discharge roller 85, reverses the sides thereof and circulates it back to the developing-transferring system 70A when the double-side copy is to be made, or it simply circulates the copy sheet back to the developing-transferring system 70A without reversing the sides when a synthesized copy is to be made.

As an example, the operation of the duplex unit 600 when making the double-side copy will be explained. The left side of the switching claw 601 is lifted upwards by an unillustrated solenoid, whereby the copy sheet from the discharge roller 85 is guided to the reversing roller 603 through the transporting roller 602. When the bottom end of the copy sheet reaches the reversion sensor SE61, the reversing roller 603 starts to rotate in the opposite direction, so that the copy sheet is transported to the roller 86a. Further, the copy sheet is forwarded to the timing roller 82 through the rollers 86b and 86c. In the meantime, the following copy sheets are successively fed into the duplex unit 600 with evenly spaced apart each other, and the maximum number of the copy sheets to be held temporarily therein depends on the copy sheet sizes, provided that there is no delay in image data transmission.

The operation panel OP depicted in FIG. 2(a) is attached on top of the photocopier 1 for the manual input and display of copying conditions. It comprises an LC (Liquid Crystal) touch panel 91 for indicating warning such as jamming, a service man call, and paper empty as well as other conditions such as a threshold level, magnification ratio, and copy sheet size; a 10-key group for setting a desired number of copies and magnification ratio; a clear key 93 for clearing the set number of copies; a panel reset key 94 for clearing all the set conditions; a stop key 95 for stopping the copying operation; a start key 96 for starting the copying operation; a copying mode setting key 97 for setting a desired copying mode (i.e. one of Single-Single side, Double-Single side, Single-Double side, Double-Double side modes); LEDs (Light Emitting Diodes) 97a–97d for indicating of which copying mode the photocopier 1 is currently set into; an electronic sorting mode selecting key 98 for selecting an electronic sorting mode; and an LED 98a for indicating that the photocopier 1 is set in the electronic sorting mode.

Figure 3:
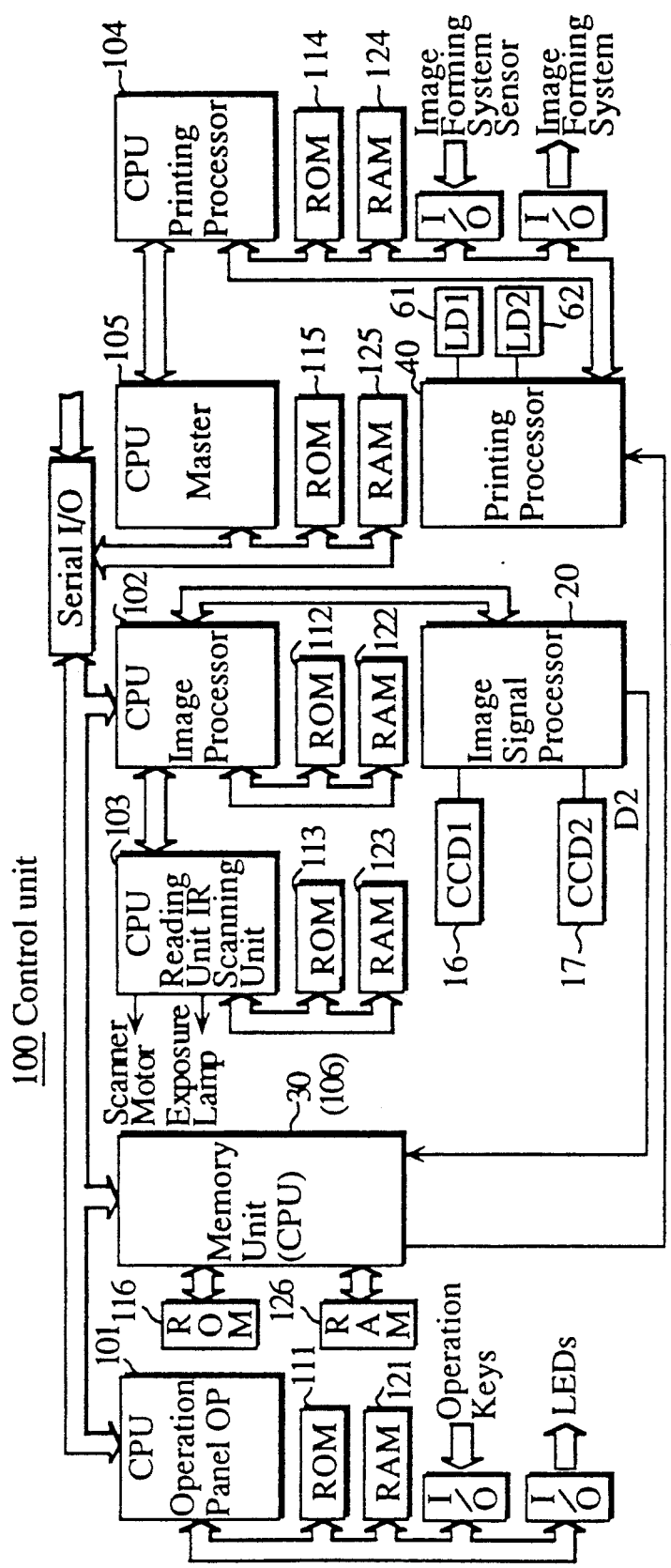
FIG. 3 is a block diagram of the control unit 100.
Figure 4:
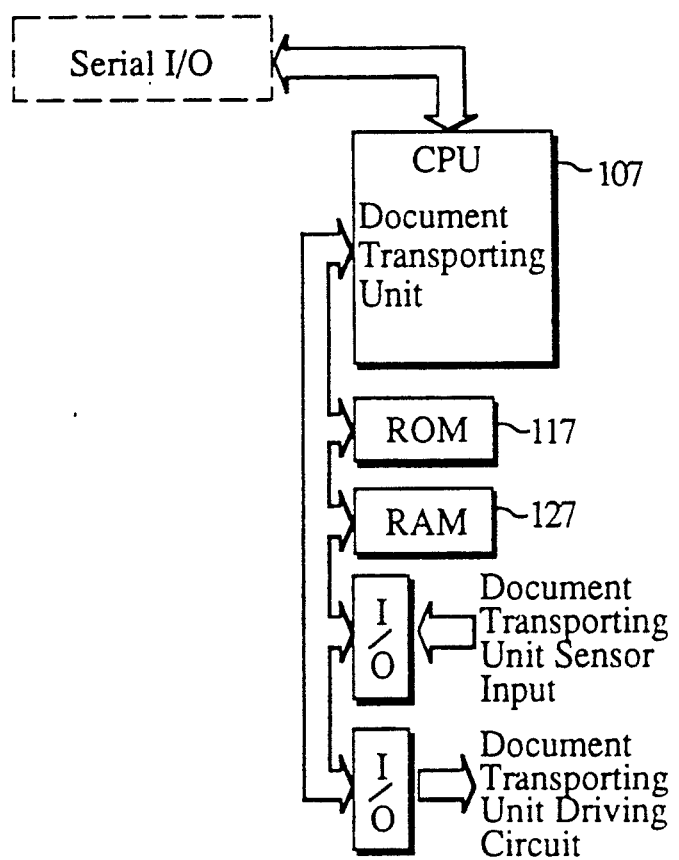
FIG. 4 is another block diagram of the control unit 100.

It is the control unit 100 that controls the photocopier 1 constructed as above, and as is depicted in FIGS. 3 and 4, it mainly comprises seven CPUs (Central Processing Unit) 101–107 which include ROMs (Read Only Memories) 111–117 storing respective programs, and RAMs (Random Access Memories) 121–127 serving as work areas for the programs, respectively; CPU 106 is installed in the memory unit 30. Each CPU is assigned a particular task: CPU 101 is responsible for the operation of the operation panel OP, and it controls the input of conditions from each key and the display thereon in the form of electrical signal; CPU 102 is responsible for the operation of the image signal processor 20; CPU 103 is responsible for the operation of the scanning system 10; CPU 104 is responsible for the operation of the printing processor 40, optical system 60, and image forming system 70, or namely the printing unit PRT; CPU 105 is responsible for the operation of the photocopier 1 such as control of the operation timing of each component and mode setting; CPU 106 is responsible for the memory unit 30; and CPU 107 is responsible for the document transporting unit 500. It can be said that CPU 105 is the master CPU and the others are slave CPUs, and they are connected each other by means of a serial I/O and a serial transmission path to accept interrupt instructions mutually.

Figure 5:
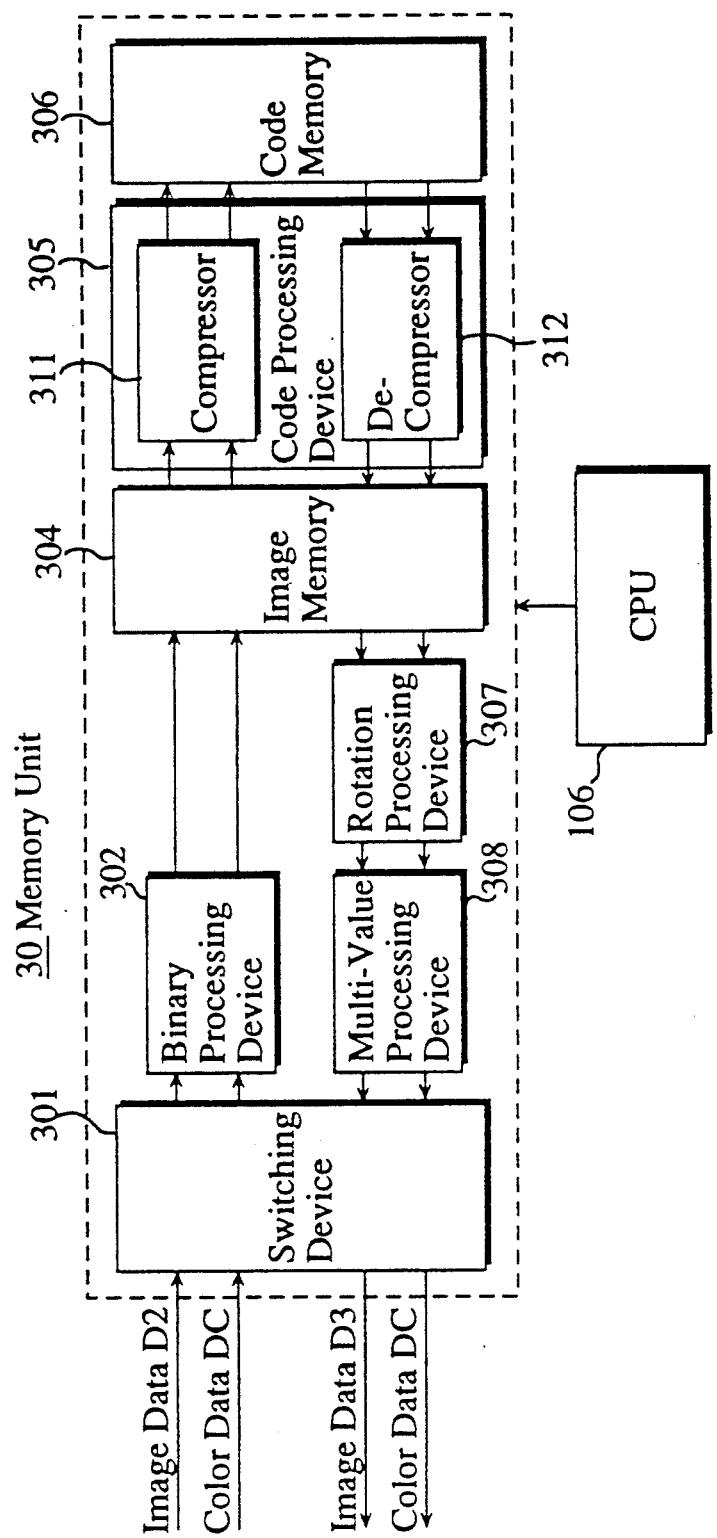
FIG. 5 is a view showing the construction of the memory unit 30.

Detailed in FIG. 5 is the memory unit 30. It includes a switching device 301, a binary processing device 302, an image memory 304, a code processing device 305, a code memory 306, a rotation processing device 307, and a multi-value processing device 308.

As previously explained, the memory unit 30, which is under the control of CPU 106, outputs the image data D3 and color data DC to the printing unit PRT either directly or through the memory. Let the former be referred to as a direct mode and the latter as a memory mode which includes a writing operation and a readout operation.

The switching device 301 changes over in accordance with the mode and operation currently selected. In case of the direct mode, it changes over in such a way that the image data D2 and its color data DC are directly outputted as the image data D3 and color data DC. In case of the writing operation in the memory mode, it changes over to the binary processing device 302 to write the image data D2 and its color data DC into the image memory 304, and in case of the readout operation in the same mode, it changes over to the multi-value processing unit 308 to readout the image data D2 and its color data DC from the image memory 304 through the rotation processing device 307. It should be noted that the above changeovers enable simultaneous writing and readout operation, and hence parallel operation of the image reading unit IR and printing unit PRT, contributing to enhancement of the overall processing speed.

The binary processing unit 302 converts the image data D2 and its color data DC from the switching device 301 into a binary digit by using a parameter from CPU 106.

The image memory 304 is a multi-port memory for storing the binary digit from the binary processing unit 302, and it has a capacity comparable to the amount of data for two pages of 400 dpi, A4 size papers (approximately 16 Mbyte).

The code processing device 305 includes a compressor 311 and a de-compressor 312 which can operate parallel to each other. The former reads out the binary digit stored in the image memory 304 and converts it into compressed code data (in other words, it eliminates redundancy codes) to write them into the code memory 306 at the writing operation, whereas the latter reads out the compressed code data from the code memory 306 and de-compresses them back into the binary digit to output it to the image memory 304 at the readout operation. An unillustrated DMAC (Direct Memory Access Controller) is used for the code data transmission among the compressor 311, de-compressor 312, and code memory 306, and thus it is called the DMA transmission.

Figures 6A, 6B:
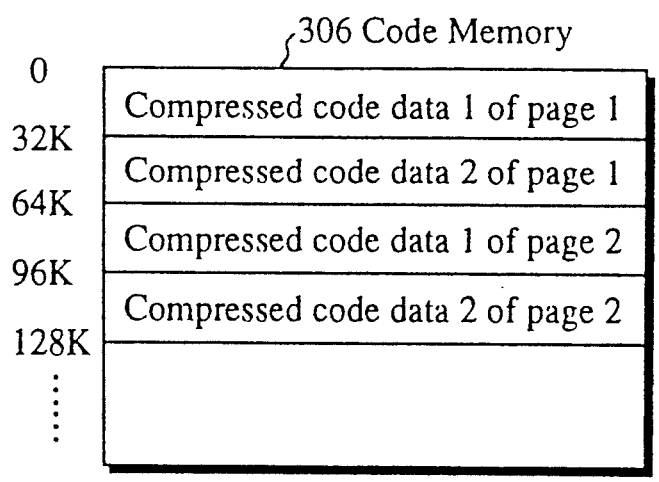
FIGS. 6a and 6b are views illustrating the MT1 and memory areas.

The code memory 306 is a multi-port memory into which the compressed code data from the compressor 311 are stored, and from which they are read out to the de-compressor 312. It consists of a plurality of memory areas of 32-kbyte, and each area stores data of one page to enable simultaneous data writing and readout. These memory areas are managed by a managing table MT1 installed in RAM 126 as is shown in FIG. 6(a), and the memory areas of the code memory 306 is shown in FIG. 6(b). Numerals in the area column are serial reference numbers for the areas, those in the page column are the number of document pages whose data are stored therein. The data of one page are stored into several areas in general, and the linkage of these areas is indicated either by fore-concatenation or aft-concatenation. In the fore-concatenation column, "00" denotes the head of such concatenation, and other numerals denote intermediate areas. Likewise, in the aft-concatenation, "FF" denotes the end of such concatenation, and other numerals denote intermediate areas. Other data necessary for converting the image data into the compressed code data and vice versa such as the length of the image data, a variable PW (the code memory 306's page number in the writing operation), and a variable PR (the code memory 306's page number in the readout operation) are written into an additional data column. The MT1 is updated each time the compressed code data are written thereinto or read out therefrom.

The rotation processing device 307 outputs the binary digit from the image memory 304 to the multi-value processing unit 308 after applying the rotation process when necessary.

The multi-value processing device 308 generates multi-value data from the binary digit by using the parameter from CPU 106 and outputs them to the switching unit 301.

Figure 7:
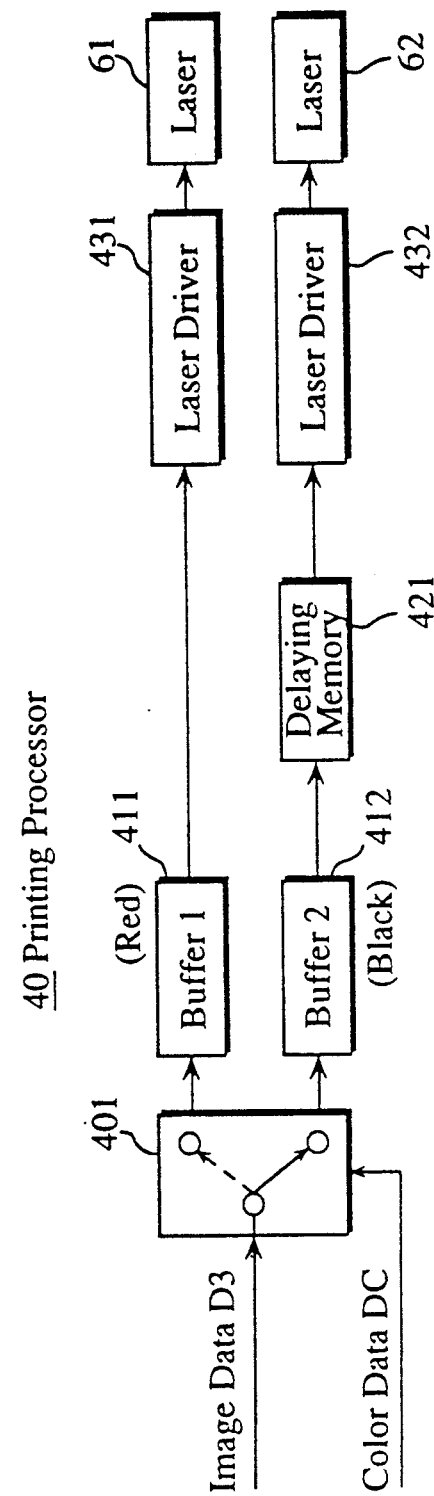
FIG. 7 is a view showing the construction of the printing processor 40.

The printing processing unit 40 shown in FIG. 7 comprises a color separating selector 401, two buffers 411 and 412, a delay memory 421, laser drivers 431 and 432 for driving the semiconductor lasers 61 and 62, respectively.

The color separating selector 401 changes over its output terminal from one buffer to the other based on the color data DC. When the color data DC indicates the second color, it changes over the output terminal to the buffer 411 to transmit the image data D3 to the laser driver 431, and when the color data DC indicates the first color, it changes over the output terminal to the buffer 412 to transmit the image data D3 to the laser driver 432 through the delay memory 421. Because the semiconductor lasers 61 and 62 have different points of exposure, the output of the image data D3 of the first color is delayed for the latency comparable to such a difference in their optical path lengths. The laser drivers 431 and 432 control the semiconductor lasers 61 and 62 based on the image data D3 of respective colors, so that the semiconductor lasers 61 and 62 emit corresponding light of beams on the respective points of exposure.

Figure 8:
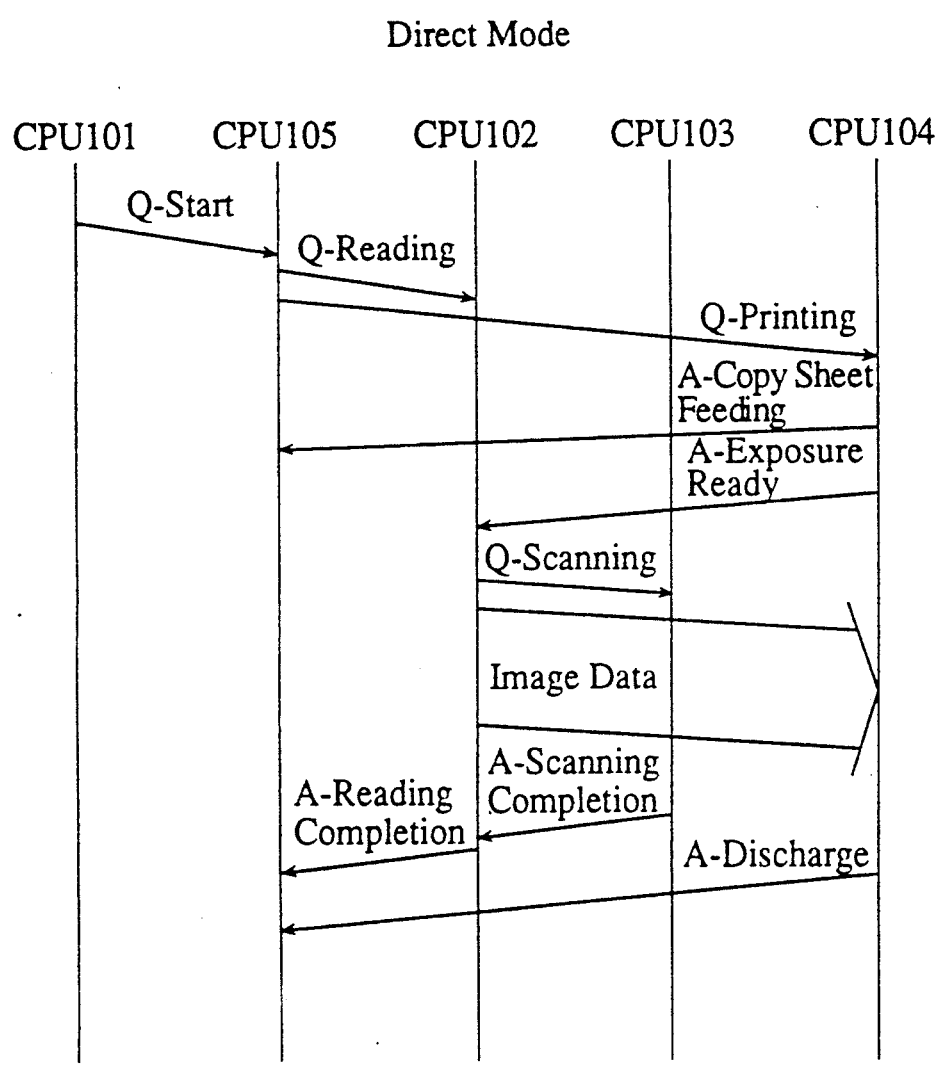
FIG. 8 is a sequence diagram in the direct mode.
Figure 9:
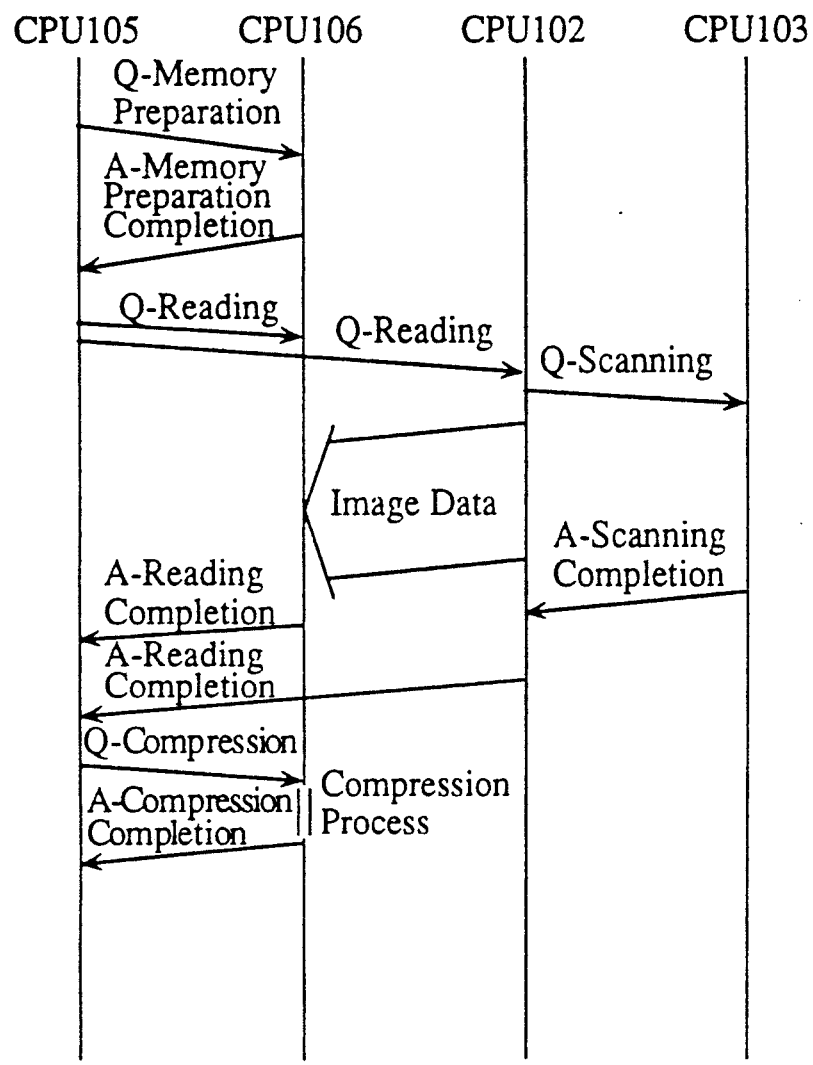
FIG. 9 is a sequence diagram in the writing operation in the memory mode.
Figure 10:
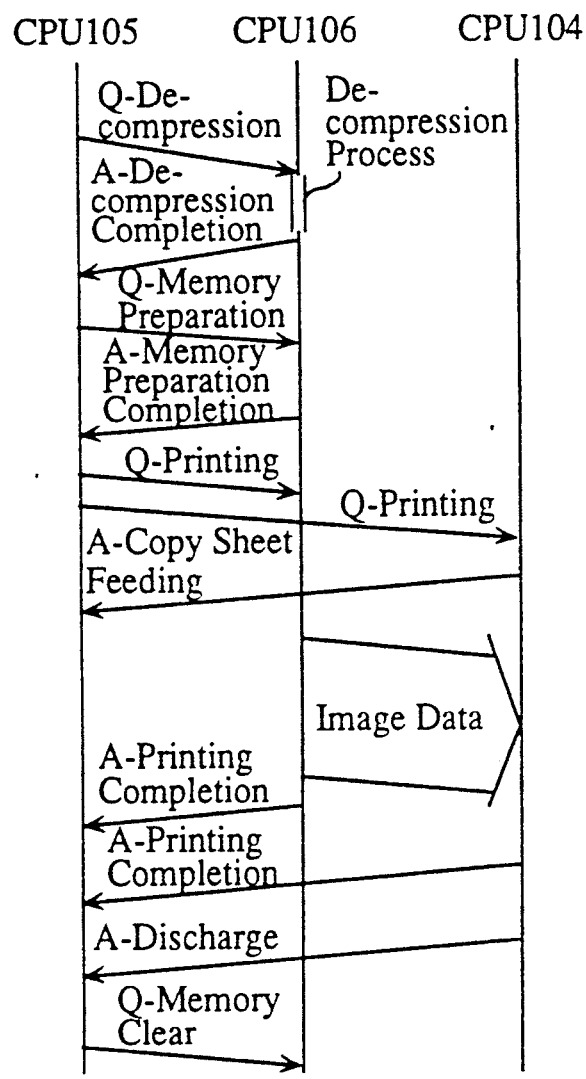
FIG. 10 is a sequence diagram in the readout operation in the memory mode.

As previously mentioned, CPU 105 controls the other CPUs with messages (i.e. requests and responses) transmitted between them, and depicted in FIGS. 8-10 is how and what messages are transmitted in the direct, writing and readout operations in the memory mode, respectively. In the drawings, a capital letter Q denotes a request, and a capital letter A does a report to the request.

(Direct Mode)

The sequence diagram in the direct mode, where the image reading unit IR transmits the image data directly to the printing unit PRT, is shown in FIG. 8.

When the start key 96 is pressed, CPU 101 outputs a request for start to CPU 105 which in turn outputs a request for reading and a request for printing to CPU 102 and CPU 104, respectively.

Accordingly, CPU 104 outputs a report of copy sheet feeding to CPU 104 to notify the current condition with respect to the transporting system 70B. Also, it outputs a report of exposure-ready to CPU 102 to notify that the image forming system 70B is ready for exposure as the copy sheet reaches a predetermined position therein.

Upon receipt of the exposure-ready report, CPU 102 outputs a request for scanning to CPU 103, whereby the scanner 19 starts the scanning in such a way that the operation of the image reading unit IR synchronizes with that of the printing unit PRT. When the scanning line reaches an image area of the document, CPU 102 applies necessary processing as per selected modes such as magnification ratio, γ correction, and quality correction to the obtained image data, while outputting the processed image data to the printing unit PRT for the printing.

At the completion of the scanning, CPU 103 outputs a report of scanning completion to CPU 102 which in turn outputs a report of reading completion to CPU 105. As well, CPU 104 outputs a report of discharge completion to CPU 105 to notify that the copy sheet has been discharged, whereby CPU 105 acknowledges the completion of the copying operation.

(Writing Operation in the Memory Mode)

The sequence diagram in the writing operation in the memory mode, where the image reading unit IR transmits the image data to the memory unit 304, is shown in FIG. 9.

To begin with, CPU 105 outputs a request for memory preparation to CPU 106 which accordingly sets its internal hardware: it changes over the switch unit 301 to transmit the image data D2 and color data DC from the image signal processing unit 20 to the image memory 304, and converts them into binary digit following the setting modes such as error dispersion, threshold levels for eliminating the background of the document and for the binary digits conversion, the initial writing address of the image memory 304, and XY length data.

When CPU 106 is ready for the writing operation, it outputs a report of memory preparation completion to CPU 105 which in turn outputs a request for reading to CPU 106 and CPU 102. Accordingly, CPU 102 outputs a request for scanning to CPU 103, whereby the scanning starts. When the scanning line reaches the image area of the document, CPU 102 applies processing according to the set modes, and outputs the image data D3 and color data DC to the memory unit 30.

Upon the completion of the scanning, CPU 103 outputs a report of scanning completion to CPU 102, whereupon CPU 102 and CPU 106 output a report of reading completion to CPU 105. Subsequently, CPU 105 outputs a request for compression to CPU 106 which determines the readout address in the image memory 304, XY length data, writing address in the code memory 306, and a coding method for the compressor 311 such as the MH (Modified Huffman Code) method, whereby the image data are compressed into the code data to be stored into the code memory 306. Upon the completion of the data compression, CPU 106 outputs a report of compression completion to CPU 105, whereby CPU acknowledges the completion of the writing operation. CPU 106 notifies CPU 105 of the memory-full by outputting another report of compression completion with the parameter indicating so.

(Readout Operation in the Memory Mode)

The sequence diagram in the readout operation in the memory mode, where the memory unit 304 outputs the image data to the printing unit PRT, is shown in FIG. 10.

To begin with, CPU 105 outputs a request for decompressing to CPU 106 which determines the readout address in the code memory 306, the amount of the code data, writing address in the image memory 304, XY length data, and a coding method of the de-compressor 312 such as the MH method, whereby the code data are de-compressed to the image data in the form of the binary digit to be stored into the image memory 304. Upon completion of the de-compression, CPU 106 outputs a report of de-compression completion to CPU 105.

Subsequently, CPU 105 outputs a request for memory preparation to CPU 106 to read out the image data from the image memory 304, and accordingly CPU 106 sets its internal hardware: it changes over the switch device 301 to transmit the image data D3 and color data DC from the image memory 304 to the printing processor 40, while setting conditions for the rotation process, the initial readout address in the image memory 304, and XY length data.

When CPU 106 is ready for the readout operation, it outputs a report of memory preparation completion to CPU 105 which outputs a request for printing to CPU 106 and CPU 104. CPU 104 correspondingly outputs a report of copy sheet feeding to CPU 105 to notify the current condition of the transporting system 70B. Accordingly, the image data D3 and color data DC are outputted to the printing unit PRT, whereby the printing starts.

Upon completion of the printing, CPU 106 outputs a report of printing completion and CPU 104 does the report of printing completion and that of discharge completion to CPU 105 which in turn outputs a request for memory clear to CPU 106. Thus, the image data of the corresponding page are cleared from the code memory 306. In particular, when this memory clear request is issued at the memory-full, the code memory 306 restores a free area, releasing it from the memory-full.

For further understanding, how the writing into and readout from the code memory 306 is controlled when the memory-full occurs in the electronic sorting mode is explained with referring to FIG. 11. In this example, twenty pages of documents A-T are to be copied, the code memory 306 has a capacity comparable to six pages, the number of copies N has 3, and the documents reading and the writing into the code memory 306 are carried out in alphabetical order, i.e. from A to T.

Under these conditions, the memory-full occurs when the image data of the seventh page G are being stored into the code memory 306 in addition to those of the documents up to the sixth page, from A to F as is shown in FIG. 11(a). Upon the occurrence of the memory-full, the number of copies is changed forcibly to 1 from 3 under the control of CPU 105, and the code data of the document A are read out to make one copy thereof and to be cleared subsequently under the control of CPU 106, whereby the memory restores a free' area for the code data of the following document G. Thus, the code memory 306 safely stores the code data of documents B-G as is shown in FIG. 11(b), but the memory-full occurs again when the code data of the following document H are being written thereinto.

Correspondingly, the code data of the document B are read out to make one copy thereof and subsequently cleared, whereby the memory restores a free area again for the code data of the following document H. Thus, the code memory 306 safely stores the code data of the documents C-H as is shown in FIG. 11(c), but the memory-full occurs once again when the code data of the following document I are being written thereinto.

As has be explained, every time the memory-full occurs, the code data of one page are cleared by being read out for the printing, and the code data of a new page are written into instead. Thus, the writing and readout are carried out successively until the last page of documents is copied even when the memory has a small capacity for the total amount of the documents. Although only one set of copy is made in this embodiment, the remaining two more sets of copies can be made by copying the original documents together with the one set of copies which is already made.

In addition, although the user may leave the photocopier 1 after he has pressed the start key 96 and the memory-full may occur during his absence, the user knows the necessary action the instant he returns. Because the LC touch panel 91 is designed to indicate an instruction message at the occurrence of the memory-full, such as the one shown in FIG. 2(b)-"2 more sets must be made. Place the documents and press the start key again". Thus, not only the user but anyone can easily understand that the two more sets of copies must be made, and by smoothly following the instruction on display, overall work efficiency can be enhanced.

Depicted in FIGS. 12-17 are flowcharts detailing the operation of the concerned CPUs in the writing and readout operations in the memory mode explained in the above.

Figure 12:
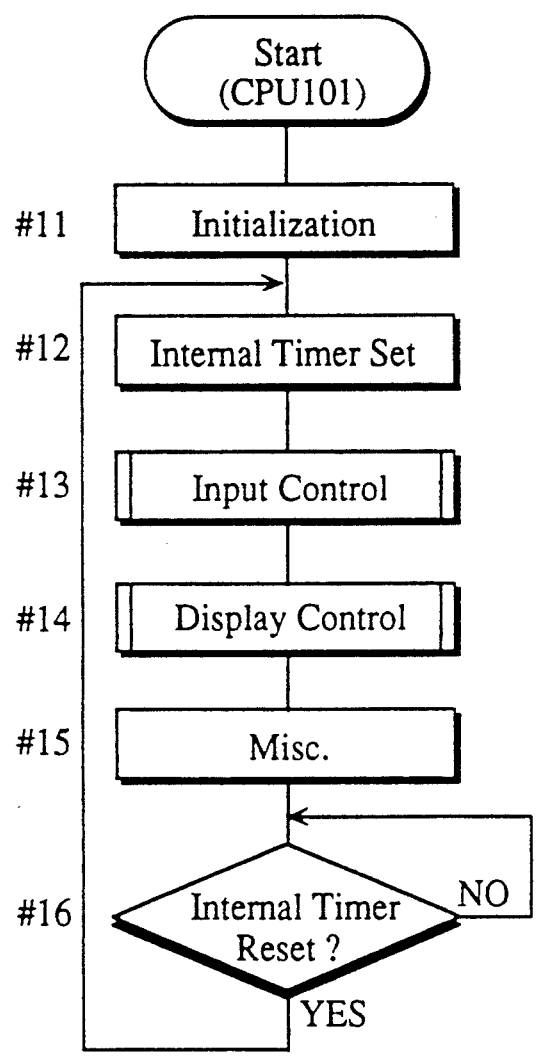
FIG. 12 is a flowchart detailing the operation of CPU 101.

A flowchart in FIG. 12 details the operation of CPU 101. When the power is turned on, CPU 101 initializes itself (Step 11) and sets its internal timer (Step 12), so that the following steps are carried out in a certain period of time, for example within 30 mS. Once the internal timer is set, CPU 101 controls the input through the operation panel OP (Step 13), display thereon (Step 14), and miscellaneous conditions (Step 15); Steps 13 and 14 have sub-routines, which will be detailed later. The above Steps 12-15 are repeated upon the confirmation of the reset of the internal timer(Step 16), and CPU 101 communicates with other CPUs through interrupt instructions during these steps.

Figure 13A:
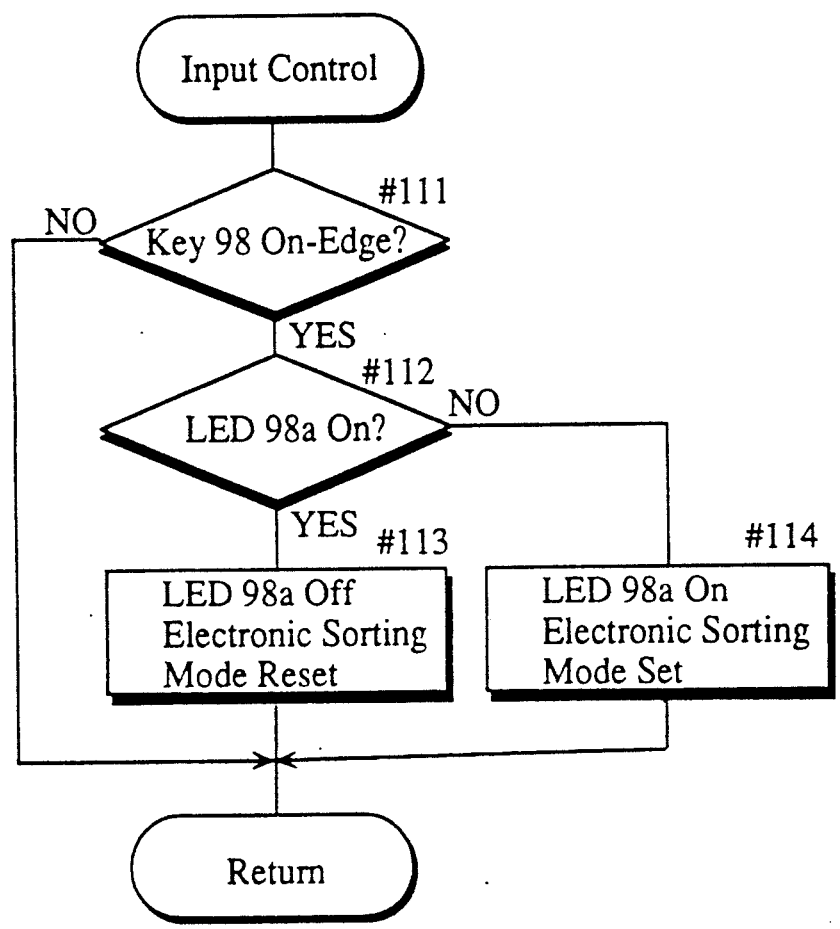
FIG. 13a is a flowchart detailing the input control by CPU 101.

A flowchart in FIG. 13a details the sub-routine of Step 13, or how the input through the operation panel OP is controlled. CPU 101 detects the input of an on-edge indicating that the electronic sorting mode selecting key 98 is pressed (Step 111). If the on-edge is not inputted, CPU 101 closes the sub-routine and returns to the main routine shown in FIG. 12; otherwise it further detects whether LED 98a is on or not (Step 112). If LED 98a is on, it is turned off to reset the electronic sorting mode (Step 113); otherwise, it is turned on to set the electronic sorting mode (Step 114), and the subroutine is closed subsequently.

Figure 13B:
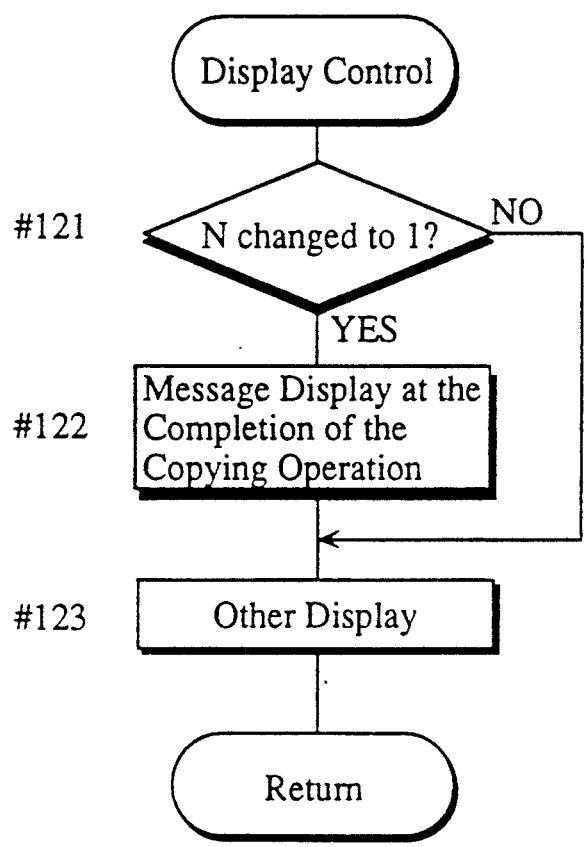
FIG. 13b is a flowchart detailing the display control by CPU 101.

A flowchart in FIG. 13b details the sub-routine of Step 14, or how the display on the operation panel OP is controlled. CPU 101 detects whether the number of copies N is changed to 1 due to the occurrence of the memory-full in the electronic sorting mode (Step 121). If so, CPU 101 displays an instruction message such as the one shown in FIG. 2(b) (Step 122), and the sub-routine is closed after it has displayed other information (Step 123). If the number of copies N remains unchanged, the sub-routine is closed after it has displayed other information.

Figure 14:
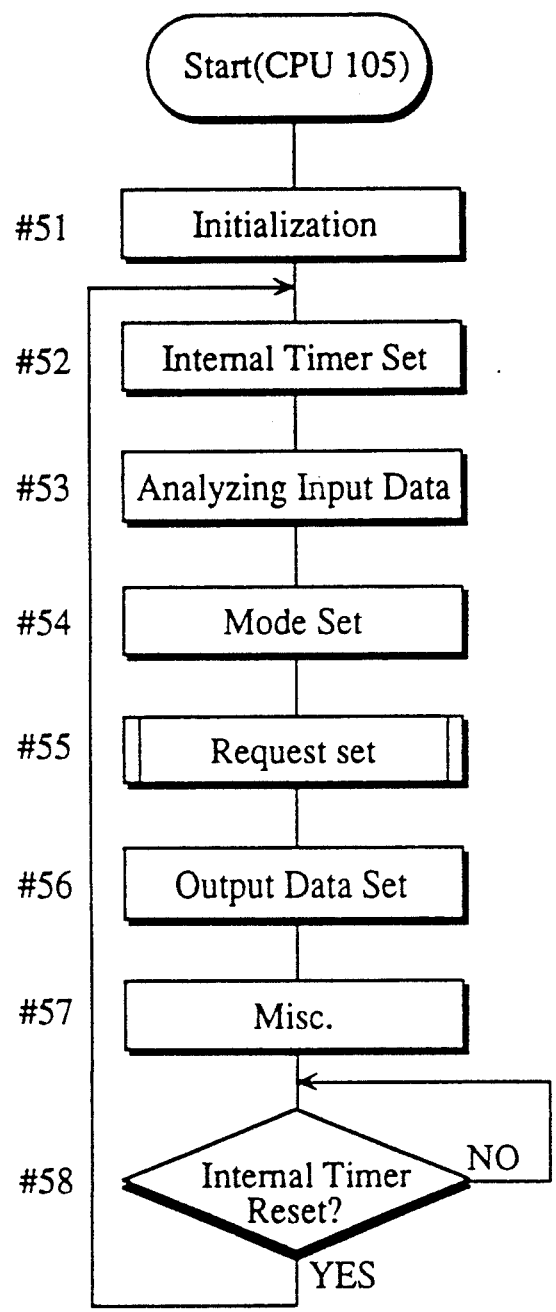
FIG. 14 is a flowchart detailing the operation of CPU 105.

A flowchart in FIG. 14 details the operation of CPU 105. When the power is turned on, it initializes itself (Step 51), and sets its internal timer, so that the following steps are carried out in a certain period of time (Step 52). It checks and analyzes data inputted thereto from other CPUs through the interrupt communication (Step 53), and sets the photocopier 1 in the suitable modes to the updated data (Step 54). Subsequently, it sets requests to other CPUs in accordance with the set modes (Step 55), whereby the writing into and readout from the memory unit 30 is controlled; since Step 55 is the gist of the present invention, it is described in detail in the next paragraph. Then, CPU 105 sets these requests into buffers for the transmission to the respective CPUs (Step 56), and carries out miscellaneous matters(Step 57). Steps 52-57 are repeated after CPU 105 confirms the reset of the internal timer (Step 58).

Figure 15:
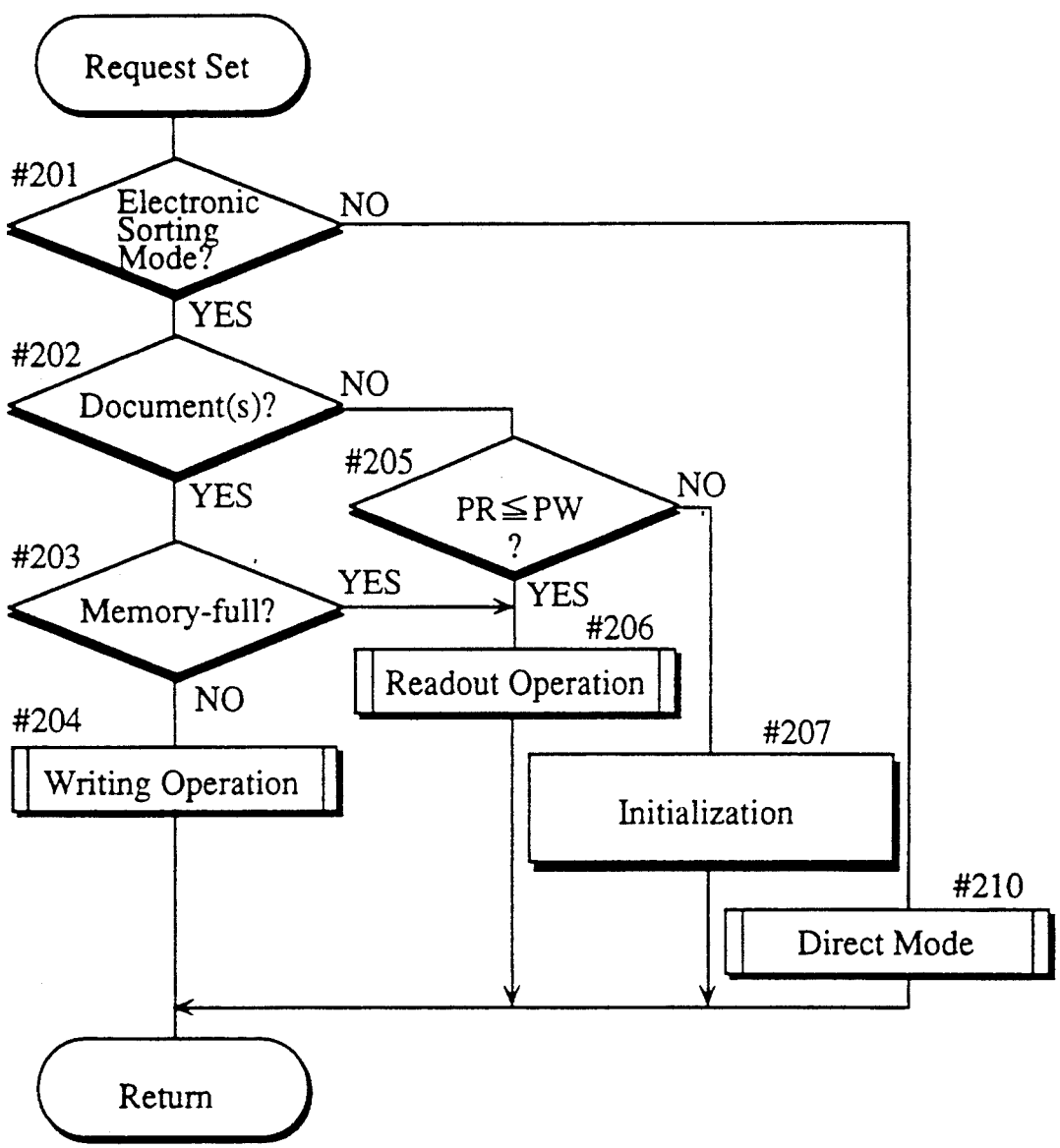
FIG. 15 is a flowchart detailing the request setting by CPU 105 in the first embodiment.

A flowchart in FIG. 15 details the sub-routine of Step 55, or how the requests are set. CPU 105 detects whether the photocopier 1 is set into the electronic sorting mode from the detection result of Step 54 (Step 201). If not, CPU 105 takes necessary steps in the direct mode (Step 210); otherwise, it further detects whether there is any document on the document tray 510 or not (Step 202), and whether there is any occurrence of the memory-full (Step 203). If there is at least a document in the absence of the memory-full, CPU 105 controls the photocopier 1 to carry out the writing operation (Step 204), which will be described later. If there is at least a document when the memory-full happens, CPU 105 controls the photocopier 1 to readout the code data from the code memory 306 to restore a free area (Step 206). On the other hand, when there is no document, and CPU 105 detects the code data in the code memory 306 by comparing the variables PW and PR (Step 205); as long as the former is larger than the latter, there is the code data. If there is any code data in the code memory 306, CPU 105 controls the photocopier 1 to read out them as many times as the number of copies N (Step 206). When there is no documents and no code data in the code memory 306, it initializes the writing and readout operations (Step 207).

Figure 16:
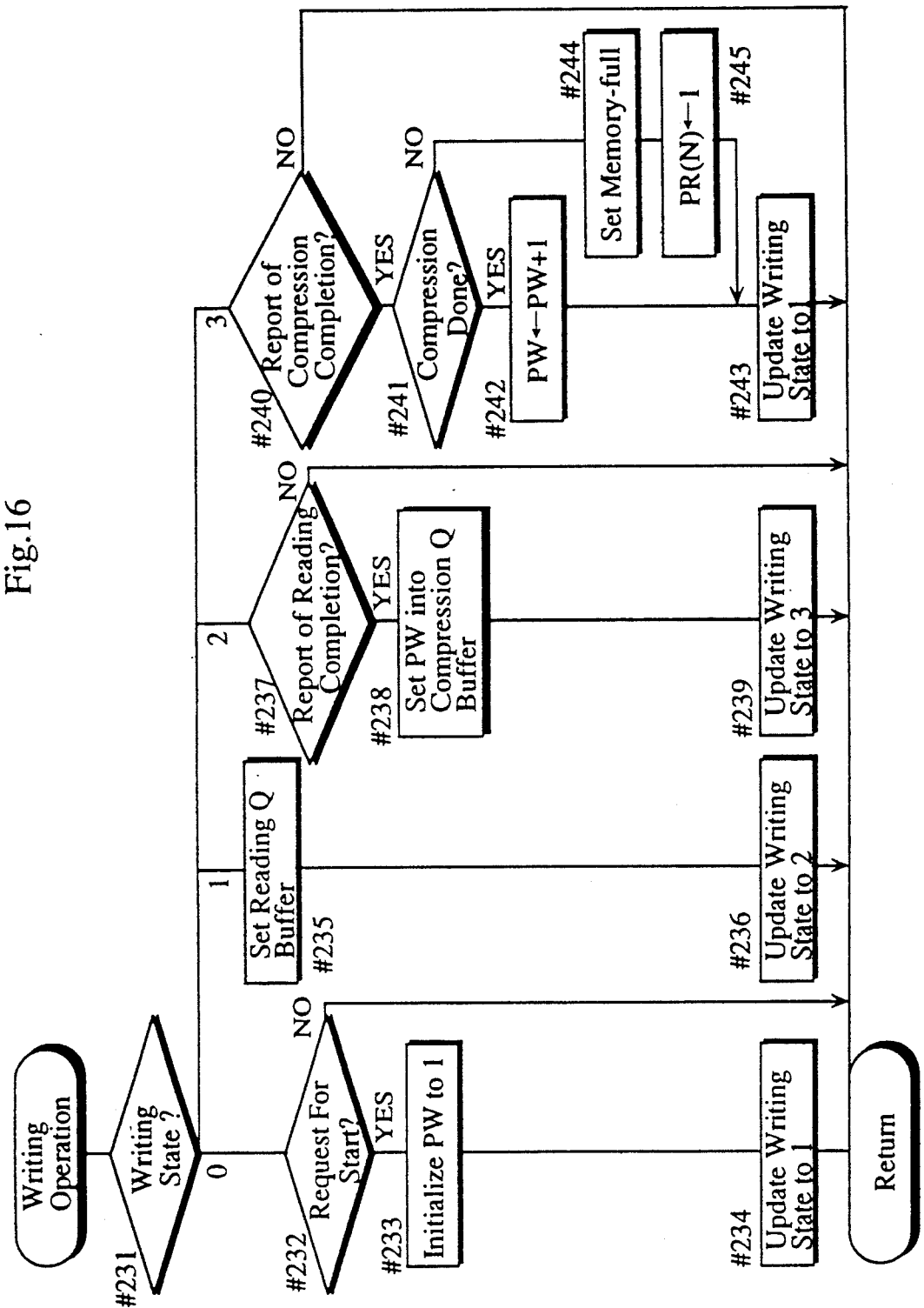
FIG. 16 is a flowchart detailing the writing operation in the memory mode in the first embodiment.

A flowchart in FIG. 16 details the sub-routine of Step 204, or how CPU 105 and CPU 106 control the writing operation. The writing operation consists of four writing states 0-3, and the code data are written into the code memory 306 by transitting from one of these states to another. In the writings state 0, or the initial state of the writing operation, CPU 105 waits for the request for start. In the writing state 1, it prepares the request for reading. In the writing state 2, it waits for the report for reading completion while preparing the request for compression. In the writing state 3, it waits for the report of compression completion.

CPU 105 detects the writing state, and branches the main routine of its program accordingly (Step 231).

In case of the writing state 0, whether there is the request for start from CPU 101 or not is detected (Step 232). If yes, CPU 105 initializes the variable PW to 1 (Step 233), and updates the writing state to 1 (Step 234), and closes the subroutine to return to the main routine in FIG. 15; otherwise, the sub-routine is closed immediately.

In case of the writing state 1, CPU 105 sets the reading request into a reading Q buffer, and updates the writing state to 2 (Step 236), whereby the reading Q buffer temporarily holds the reading request until it is transmitted; the request set in the Q buffer is readout in Step 56 in FIG. 14, and transmitted to CPU 104 and CPU 106 through the serial I/O. As many Q buffers as requests are provided in advance, and the request setting is carried out in the sub-routines of the writing and readout operations in the memory mode.

In case of the writing state 2, CPU 105 detects whether or not it has received the report of the reading completion from CPU 102 and CPU 106 (Step 237). When it has, it sets the compression request into a compression Q buffer together with the value of the variable PW(Step 238), and updates the writing state to 3 (Step 239); otherwise, it closes the sub-routine.

In case of the writing state 3, CPU 105 detects whether or not it has received the report of the compression completion from CPU 106 (Step 240). When it has, it further detects whether all of the image data of one page are compressed or not by using the parameter attached to the report of the compression completion (Step 241). If so, it means that there is still a free area in the code memory 306. Thus, CPU 105 prepares for the writing operation for the next page by incrementing the variable PW by one (Step 242), and updates the writing state to 1 (Step 243). If all of the image data of one page are not compressed, it means the occurrence of the memory-full. Thus, CPU 105 sets a flag indicating the memory-full (Step 244), and forcibly changes a variable PR(N) to 1 (Step 245). The variable PR(N) is a number showing a remaining number of times for the code data readout, and it is initialized with the number of copies N in the readout operation. CPU 105 decrements the variable PR(N) by one every time the data of the corresponding page in the code memory 306 are read out, and when it is decremented to 0, it means that the corresponding page is copied for the number of copies N.

Figure 17:
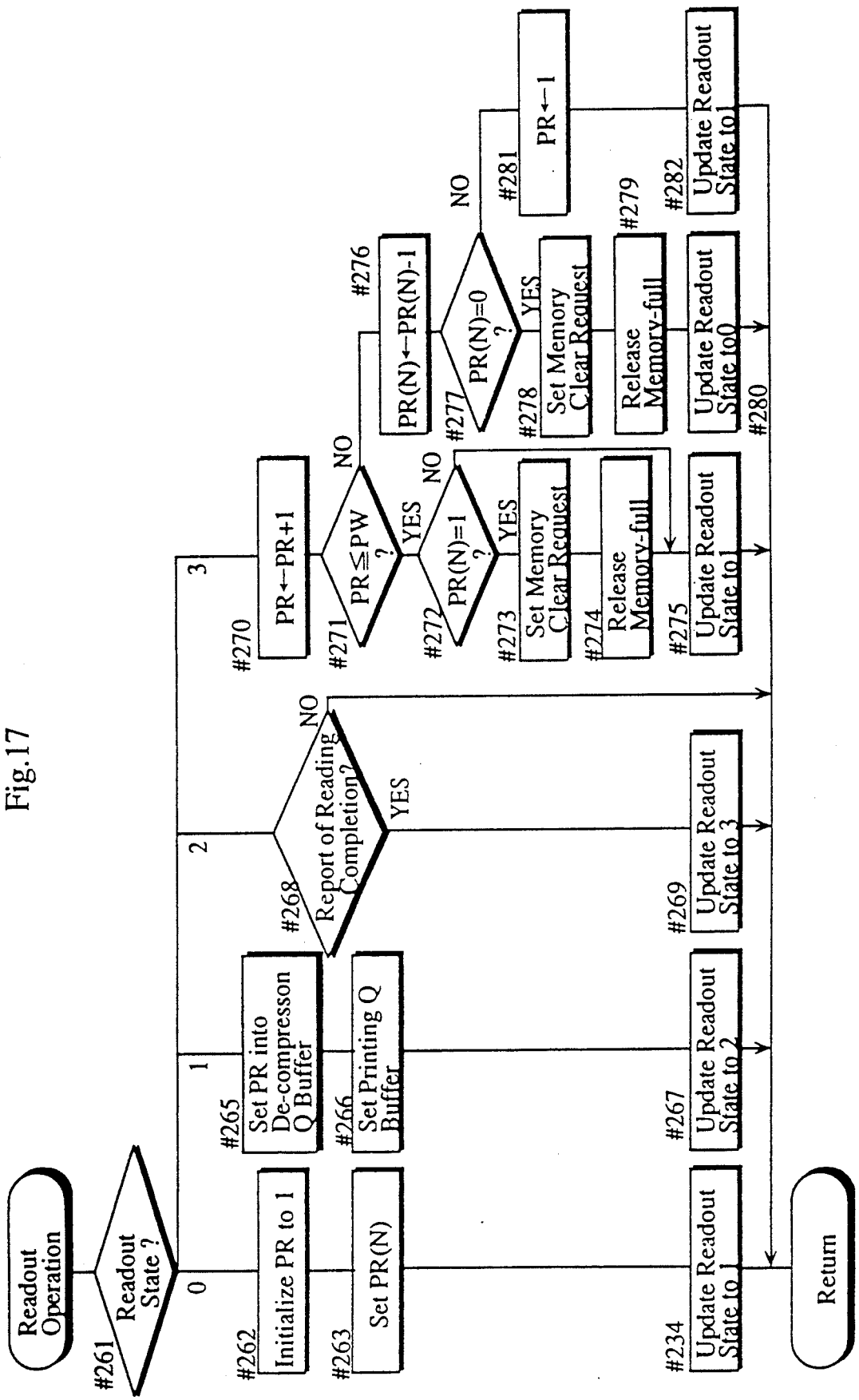
FIG. 17 is a flowchart detailing the readout operation in the memory mode in the first embodiment.

A flowchart in FIG. 17 details the sub-routine of Step 206 in FIG. 15, or how the readout operation is controlled.

The readout operation consists of four readout states 0-3, and the code data are read out from the code memory 306 by transitting from one of these states to another.

In the readout state 0, CPU 105 sets the initial value of the variables PR and PR(N) necessary for the readout operation. In the readout state 1, it prepares the request for de-compression. In the writing state 2, it waits for the report for printing completion. In the writing state 3, it sets the variable PR and prepares the memory clear request.

CPU 105 detects the current readout state, and branches the main routine of its program accordingly (Step 261).

In case of the readout state 0, CPU 105 initializes the variable PR(N) to 1 (Step 262), then sets the number of copies N for the corresponding page to the PR(N) as the initial value (Step 263), and updates the readout state to 1 (Step 264).

In case of the readout state 1, CPU 105 sets the de-compression request into a de-compression Q buffer together with the value of the variable PR (Step 265). Then, it sets the request for printing into the printing Q buffer to feed a copy sheet (Step 266), and updates the readout state to 2 (Step 267).

In case of the readout state 2, CPU 105 detects whether or not it has received the report of the printing completion from CPU 104 (Step 268). When it has, it updates the readout state to 3 (Step 269); otherwise, it closes the sub-routine.

In case of the readout state 3, CPU 105 increments the variable PR by one to readout the code data of the next page (Step 270). CPU 105 detects whether the variable PR is equal to or smaller than the variable PW(Step 271). If so, CPU 105 detects whether the variable PR(N) has 1 or not (Step 272). When the variable PR(N) has 1, it means either the copying operation for the last number of copies is completed or the number of copies is forcibly changed to 1 at the memory-full. Thus, CPU 105 sets the request for memory clear for clearing the code data of the corresponding page to CPU 106 (Step 273). Then, it resets the flag indicating the memory-full (Step 274), and updates the readout state to 1 (Step 275). In this way, the memory-full can be avoided, and all the pages are copied, albeit once. When the variable PR(N) does not have 1 in Step 272, CPU 105 changes the readout state from 3 to 1 (Step 275).

When the variable PR(N) is larger than the variable PW in Step 271, CPU 105 decrements the variable PR(N) by one (Step 276), and detects whether the variable PR(N) has 0 or not (Step 277). When the variable PR(N) has 0, it means either the completion of the copying operation as per electronic sorting mode, or completion of the copying operation for once due to the memory-full. Thus, CPU 105 outputs the request for memory clear for the entire data to CPU 106 (Step 278). Then, it resets the flag indicating the memory-full(Step 279), and updates the readout state to 0 (Step 280), whereby CPU 106 clears all the code data in the code memory 306.

When the variable PR(N) does not have 0 in Step 277, it means that the copying in the electronic sorting mode is not completed. Thus, CPU 105 changes the variable PR back to 1 (Step 281), and updates the readout state to 1 (Step 282) to return to Step 265.

As has been explained, by forcibly changing the variable PR(N) to 1, the code data of the corresponding page are read out to make one copy, and cancelled to avoid the memory-full by restoring a free area. Since the code data of the next page are stored into the restored free area, the copying operation can be carried out successively without any inteference.

The number of copies is changed to 1 in this embodiment, but it can be changed to 2, or left unchanged. However, if it is changed to a number more than 1, the sets must be sorted out manually as has been done conventionally.

(Second Embodiment)

The photocopier 1 in accordance with the second embodiment is substantially identical with the one with the first embodiment in construction. However, in this embodiment, ROMs 111-117 operate differently, and the electronic sorting mode is reset automatically at the occurrence of the memory-full while efficiently utilizing the code data which have been already stored in the code memory 306. As a result, as many copies as desired can be made without any interference.

In the first place, how the writing into and readout from the code memory 306 is controlled when the memory-full occurs in the electronic sorting mode is explained with referring to FIG. 11. The conditions such as the capacity of the memory, the number of the documents and the like are the same as the first embodiment.

The memory-full occurs when the code memory safely stores the image data of documents up to the sixth page, from A to F, as is shown in FIG. 11(a).

When the memory-full occurs, all of the code data stored in the code memory 306 are read out sequentially: the code data of the document A are readout to make three copies thereof and subsequently cleared, releasing the code memory 306 from the memory-full as is shown in FIG. 11(d). Then, the code data of the document B are readout to make three copies thereof and subsequently cleared as is shown in FIG. 11(e). The above readout-print-clear procedure is repeated until the code data of the document F are cleared, and the direct mode is applied for the remaining documents G-T, which results in making complete three sets of copies of the documents A-T without any interference during the copying operation.

The photocopier 1 of the second embodiment operates as was detailed by FIGS. 12-14 in the first embodiment, and the above control is brought about by setting different requests in Step 55 in FIG. 14. A flowchart in FIG. 18 details how the requests are set in the second embodiment.

CPU 105 detects whether the photocopier 1 is set in the electronic sorting mode or not (Step 201). If so, it further detects whether there is any document on the document tray 510 (Step 202). If there is any document in the absence of the memory-full (Step 203), CPU 105 carries out the writing operation in the memory mode (Step 204). When there is no document, and CPU 105 detects the code data in the code memory 306 by comparing the variables PW and PR (Step 205). If there is any code data in the code memory 306, CPU 105 calls for a sub-routine of the readout operation I, which consists of Step 205 and 206 in the first embodiment.

When the photocopier 1 is not set in the electronic sorting mode, CPU 105 detects whether the code memory 306 stores any code data or not (Step 208). If it detects any code data therein, it calls for a sub-routine of the readout operation II in the memory mode (Step 209). If CPU 105 detects no code data, CPU 105 calls for a sub-routine of the direct mode (Step 210).

Figure 19:
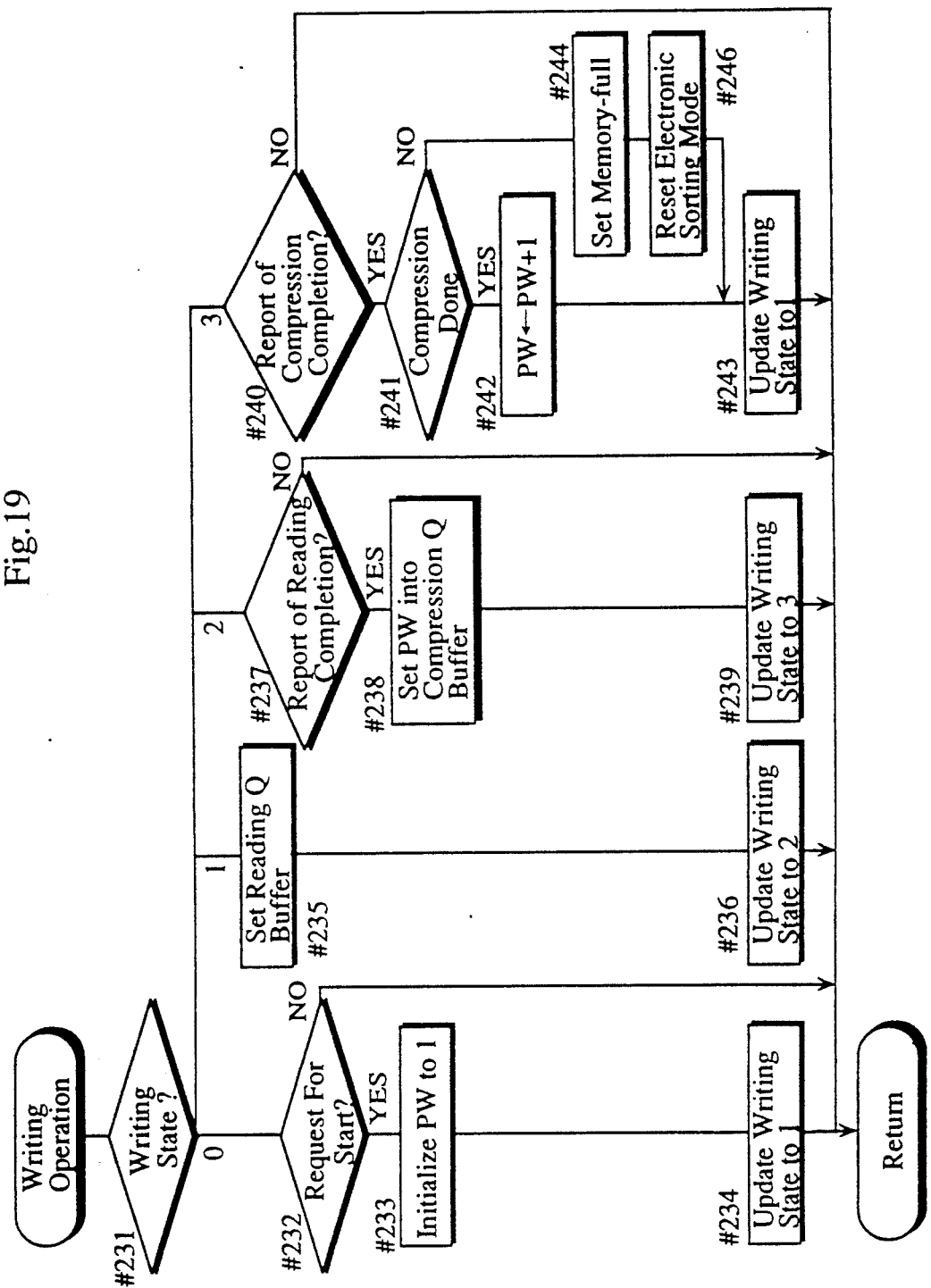
FIG. 19 is a flowchart detailing the writing operation in the memory mode in the second embodiment.

A flowchart in FIG. 19 details the sub-routine of Step 204, or how the writing operation in the second embodiment is carried out.

Like the first embodiment, there are four writing states 0-3. In the writing states 0-2, the operation is carried out in the same manner as in FIG. 16, and in the writing state 3, Step 246 is carried out instead of Step 245: when CPU 105 does not receive the report of compression completion appropriately, it sets a flag indicating the memory-full (Step 244), and resets the electronic sorting mode (Step 246). Accordingly, CPU 105 calls for a sub-routine of readout operation II in setting the request in Step 55 in FIG. 18 (Step 209).

Figure 18:
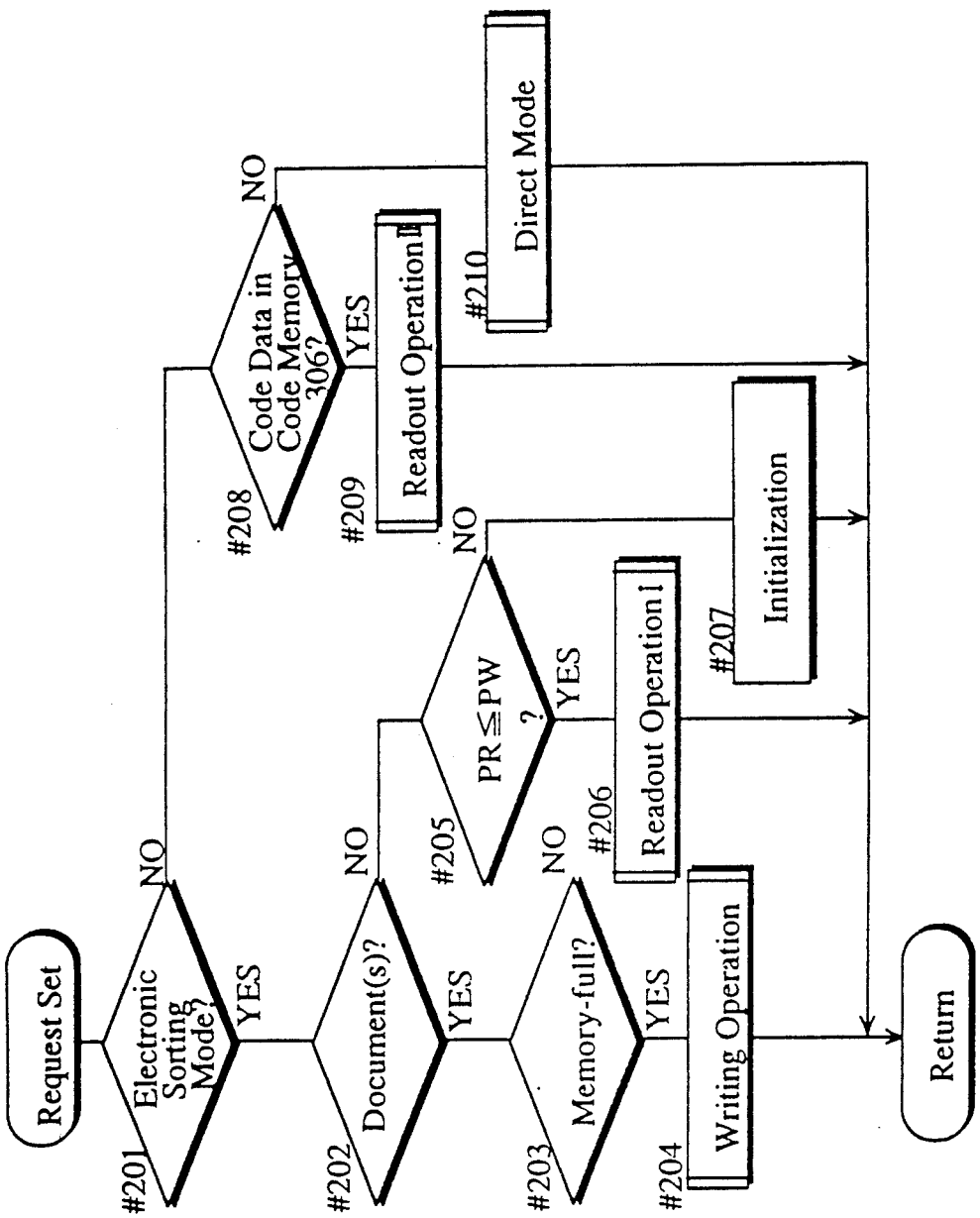
FIG. 18 is a flowchart detailing the request setting by CPU 105 in the second embodiment.
Figure 20:
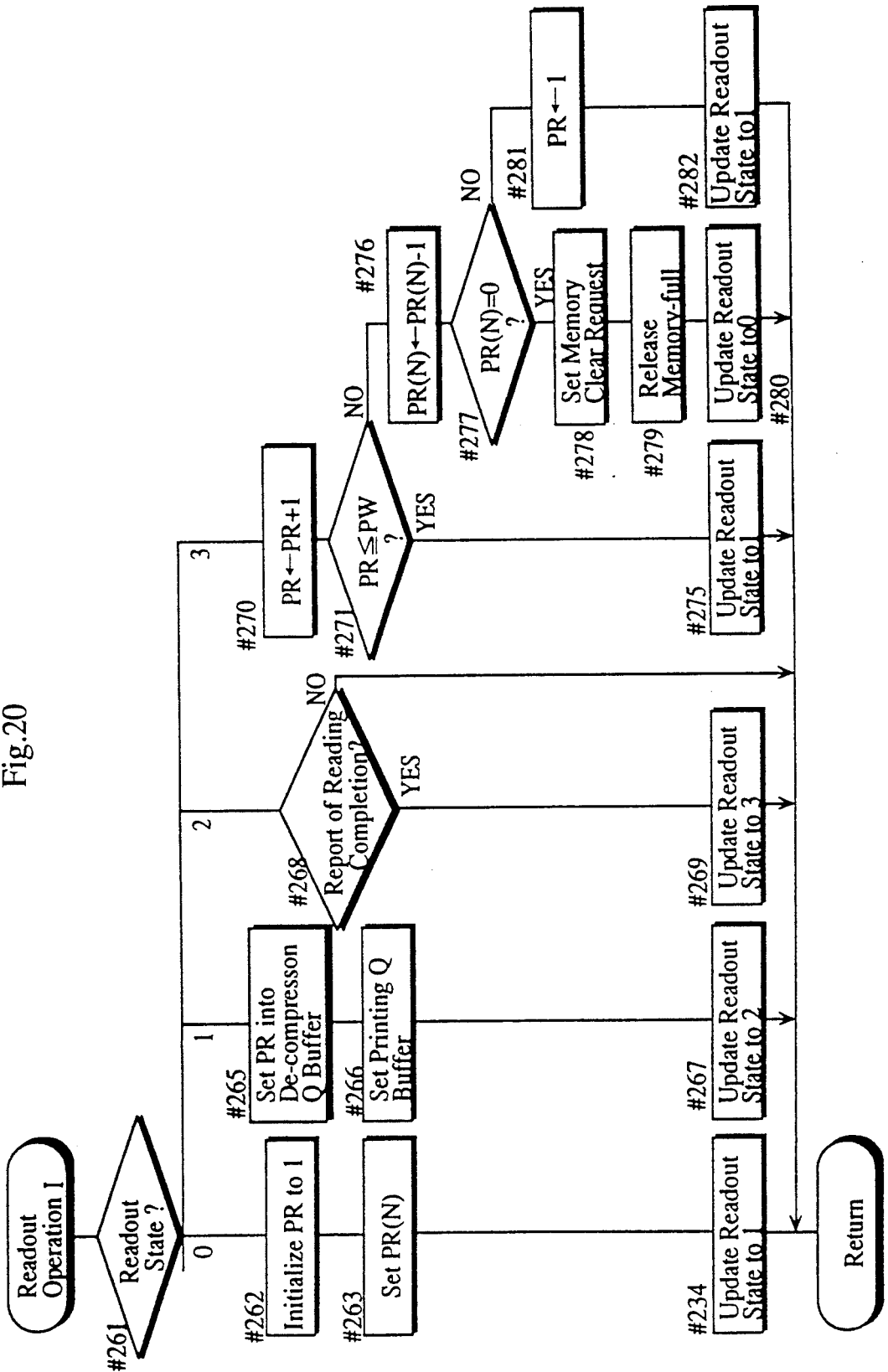
FIG. 20 is a flowchart detailing the readout operation I in the memory mode in the second embodiment.

A flowchart in FIG. 20 details Step 206 in FIG. 18, or how the readout operation I is carried out in the second embodiment. The detailed explanation is omitted, because as previously mentioned, the operation is carried out in the same manner as in FIG. 17 in the readout state 0-2, and Steps 272-274 are omitted for the readout state 3; for the number of copies is never forcibly changed to 1 in this embodiment.

Figure 21:
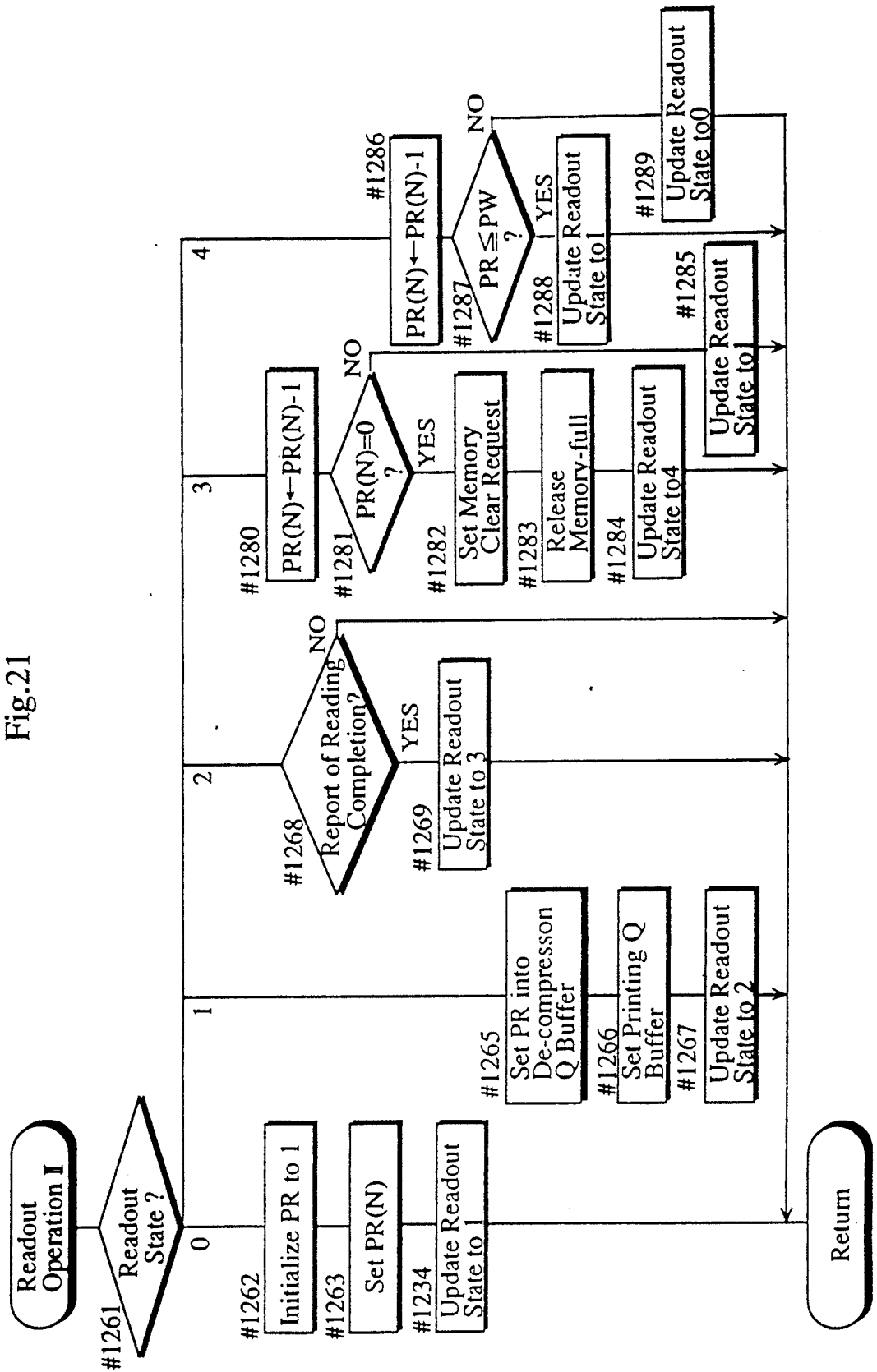
FIG. 21 is a flowchart detailing the readout operation II in the second embodiment.

A flowchart in FIG. 21 details Step 209 in FIG. 18, or how the readout operation II is carried out in the second embodiment.

The readout operation consists of five readout states 0-4, and the code data in the code memory 306 are readout by transitting one of these states from another.

In the readout state 0, CPU 105 sets the initial value of the variables PR and PR(N) necessary for the readout operation. In the readout state 1, it prepares the request for de-compression. In the readout state 2, it waits for the report for the printing completion. In the readout state 3, it checks the variable PR(N), and prepares the memory clear request. In the readout state 4, it checks the variable PR, and initializes it in Step 207.

CPU 105 branches its programme in accordance with the value of the readout state (Step 1261). In case of the readout state 0, CPU 105 sets the variable PR to 1 (Step 1262). Then, it sets the number of copies N to PR(N) as the initial value (Step 1262), and updates the readout state to 1 (Step 1264).

The operation in the readout states 1 and 2 is carried out in the same manner as the readout operation I detailed in FIG. 20, and thus the detailed explanation is omitted.

In case of the readout state 3, CPU 105 decrements the PR(N) by one (Step 1280). In this embodiment, each time the code data of the particular page of the document are read out, CPU 105 decrements the variable PR(N) by one, and when it becomes 0, it means that the printing is completed (Step 1281). Then, CPU 105 outputs the request for memory clear with respect to the pages already copied (Step 1282). Then, it resets the flag indicating the memory-full (Step 1283), and updates the readout state to 4 (Step 1284). When the copying for the number of copies N is not completed in Step 1281, CPU 105 updates the readout state to 1 to complete the copying operation (Step 1285).

In case of the readout state 4, CPU 105 increments the variable PR by one (Step 1286). CPU 105 detects whether the variable PR is smaller than the variable PW (Step 1287), and if it is so, CPU 105 updates the readout state to 1 (Step 1288) and prepares for the printing of the following page. When all of the code data are read out and printed out (Step 1287), CPU 105 initializes the readout state to 0 (Step 1289).

Figure 22:
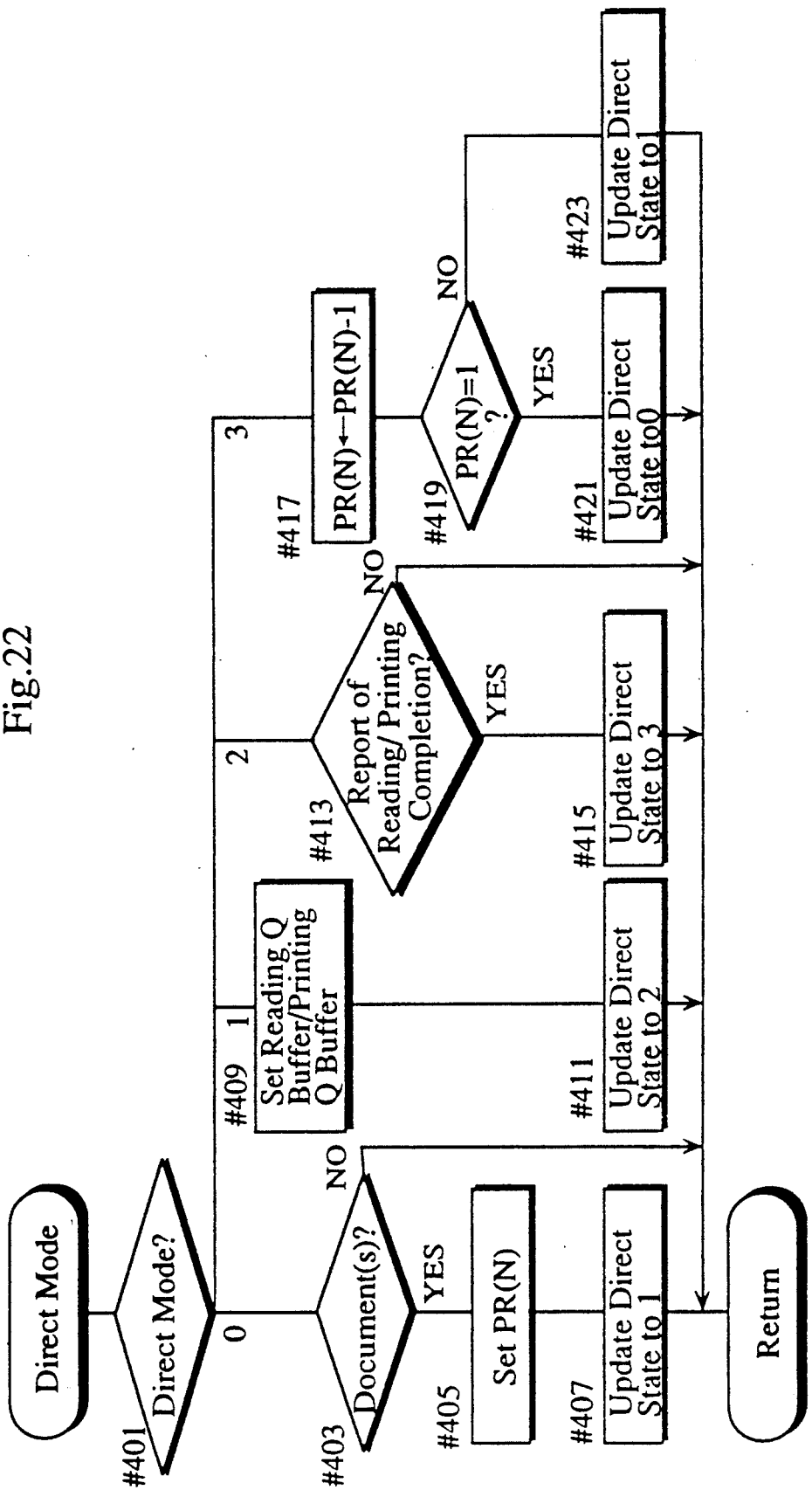
FIG. 22 is a flowchart detailing the direct mode.

A flowchart in FIG. 22 details Step 210 in FIG. 18, or how the operation in the direct mode is carried out. The operation hereof is identical with the one with a conventional analogue photocopier and the first embodiment.

The direct mode consists of four direct states 0-3, and CPU 105 branches its programme accordingly (Step 401).

In case of the direct sate 0, whether there is any document on the document tray 510 or not is detected (Step 403). If so, CPU 105 sets the number of copies N to the variable PR (N) as the initial value (Step 405), and updates the direct state to 1 (Step 407).

In case of the direct state 1, CPU 105 sets requests in the reading Q buffer and printing Q buffer (Step 409), and updates the direct state to 2 (Step 407).

In case of the direct state 2, upon the receipt of the reports of the reading completion and printing completion (Step 413), CPU 105 sets the direct state to 3 (Step 415); otherwise, it closes the sub-routine.

In case of the direct state 3, CPU 105 decrements the variable PR(N) by one (Step 417), and when it is decremented to 0 (Step 419), CPU 105 initializes the direct state to 0; for it means the completion of the copying operation (Step 421). When the variable PR is not decremented to 0 yet, CPU 105 updates the direct state to 1 (Step 423) to continue the copying operation.

As has been explained, the electronic sorting mode is reset upon the occurrence of the memory-full. Accordingly, the coded data stored in the code memory 306 are read out in the sequence the documents were read, and the direct mode is applied to the remaining documents. Consequently, the documents are copied in the number of copies N without any interruption in the copying operation.

However, the sets must be sorted out manually as ever when the memory is programmed with a readout sequence in this embodiment. Because as previously explained, the copies are made in the sequence as the documents were read, although it is much easier compared with when they are read out with no specific pattern as has been.

The remaining documents are read out in the direct mode in this embodiment, but they can be read out in the reading operation in the memory mode as well.

The photocopier 1 can be designed in such a way that the users can select either the first or second embodiments, or in such a way that the photocopier 1 automatically changes over one embodiment to the other depending on the kinds of documents, the number of documents and that of copies.

The image data are not necessarily compressed into code data, and they can be stored directly in the memory. Also, there is a wide variety of messages displayed on the LC touch panel 91.

The construction of the circuits in the control unit 100, assignment to CPUs 101-107, software programs, and the construction of the photocopier 1 can be arranged in accordance with the need of the users.

The copying conditions are inputted manually with the photocopier disclosed in the embodiments; however, the tone density, magnification ratio, copying size, or the like can be automatically selected as is with the conventional photocopier.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image forming apparatus for reading an image on at least one document to form an image on a recording medium, comprising:

image reading means for reading the images on the documents to obtain image data;

storing means for storing a plurality of said image data;

judging means for judging whether said storing means is in a memory-full condition where it has stored the image data to its full;

first control means for controlling readout of said plurality of said image data stored in said storing means;

second control means for controlling readout of said plurality of said image data stored in said storing means in a different way from said first control means;

selecting means for selecting one of said first and said second control means in accordance with a judging result of said judging means; and image forming means for forming the images corresponding to the image data read out by the selected control means on the recording medium.

2. An image forming apparatus of claim 1, wherein said first control means is designed to control in such a way that the plurality of the image data are read out in a certain readout sequence.

3. An image forming apparatus of claim 2, wherein said second control means is designed to control in such a way that the plurality of the image data are read out in a sequence by which the documents were read.

4. An image forming apparatus of claim 1, wherein said first control means is designed to control in such a way that the plurality of the image data are read out for a certain number of times.

5. An image forming apparatus of claim 4, wherein said second control means is designed to control in such a way that said certain number of times is changed to 1 to read out the plurality of the image data stored in said storing means.

6. An image forming apparatus for reading an image on at least one document to form an image on a recording medium, comprising:

image reading means for reading the images on the documents to obtain image data;

storing means for storing a plurality of said image data;

judging means for judging whether said storing means is in a memory-full condition where it has stored the image data to its full;

control means for controlling readout of said plurality of said image data stored in said storing means;

control changing means for changing control on the readout by said control means in accordance with a judging result of said judging means; and image forming means for forming the image corresponding to the image data read out under a control of said control means on the recording medium.

7. An image forming apparatus of claim 6, wherein said control means is designed to control in such a way that the plurality of the image data are read out in a certain readout sequence.

8. An image forming apparatus of claim 7, wherein said control changing means is designed to change said certain readout sequence into a sequence by which the documents were read.

9. An image forming apparatus of claim 6, wherein said control means is designed to control in such a way that the plurality of the image data are read out for a certain number of times.

10. An image forming apparatus of claim 9, wherein said control changing means is designed to change said certain number of times to 1.

11. An image forming apparatus for reading an image on at least one document to form an image on a recording medium, comprising:

image reading means for reading the images on the documents to obtain image data;

storing means for storing a plurality of said image data;

judging means for judging whether said storing means is in a memory-full condition where it has stored the image data to its full;

control means for controlling readout of said plurality of said image data stored in said storing means in accordance with a certain readout sequence and for a certain number of times;

control changing means for changing at least one of said certain readout sequence and said certain number of times when said judging means judges that said storing means is in the memory-full condition; and image forming means for forming the image corresponding to the image data read out under a control of said control means on the recording medium.

* * * * *